United States Patent
Evenson

(10) Patent No.: US 9,372,879 B1
(45) Date of Patent: Jun. 21, 2016

(54) BALANCED APPEND TREE DATA STRUCTURE

(71) Applicant: AMAZON TECHNOLOGIES, INC., Reno, NV (US)

(72) Inventor: Andrew Ross Evenson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 161 days.

(21) Appl. No.: 14/136,943

(22) Filed: Dec. 20, 2013

(51) Int. Cl.
*G06F 17/30* (2006.01)

(52) U.S. Cl.
CPC .... *G06F 17/30327* (2013.01); *G06F 17/30321* (2013.01); *G06F 17/30286* (2013.01); *G06F 17/30324* (2013.01)

(58) Field of Classification Search
CPC ............... G06F 17/30091; G06F 17/30327; G06F 17/3002; G06F 17/30336
USPC .............................. 707/741, 754, 793–798, 791
See application file for complete search history.

(56) References Cited

U.S. PATENT DOCUMENTS

| | | | | |
|---|---|---|---|---|
| 6,978,271 B1* | 12/2005 | Hoffman | ........... | G06F 17/30091 |
| 7,194,477 B1* | 3/2007 | Bradley et al. | | |
| 7,805,393 B1* | 9/2010 | Venkatachary | ......... | G06N 5/02 706/48 |
| 7,809,539 B2* | 10/2010 | Brocklebank et al. | .......... | 703/11 |
| 8,028,338 B1* | 9/2011 | Schneider | ............ | G06F 21/564 713/188 |
| 8,065,304 B2* | 11/2011 | Ross | .................. | G06F 12/0246 707/737 |
| 8,743,253 B2* | 6/2014 | Okano | .................. | H04N 3/155 348/302 |
| 2005/0076312 A1* | 4/2005 | Gardner et al. | ............... | 715/853 |
| 2011/0138339 A1* | 6/2011 | Webster et al. | ............... | 715/854 |
| 2012/0179699 A1* | 7/2012 | Ward et al. | .................... | 707/754 |
| 2012/0203740 A1* | 8/2012 | Ben-Dyke | ........ | G06F 17/30595 707/639 |
| 2013/0332465 A1* | 12/2013 | Sasaki | .......................... | 707/741 |

FOREIGN PATENT DOCUMENTS

EP 2109335 A1 * 10/2009 ............ H04W 24/00

* cited by examiner

*Primary Examiner* — Frantz Coby
(74) *Attorney, Agent, or Firm* — Lindauer Law, PLLC

(57) ABSTRACT

Techniques are described for employing a substantially self-balanced append tree data structure to store and access information. The append tree data structure is a hierarchical data structure in which a leaf node or a parent node may be added to expand the append tree data structure. The determination to add a leaf node or a parent node may be based on a counter for leaf nodes present in the append tree data structure. Nodes in the append tree data structure may be blocks in memory, with each block corresponding to a plurality of positions that may be employed to tracking message identifiers in a messaging service.

20 Claims, 15 Drawing Sheets

BALANCED APPEND TREE DATA STRUCTURE

BACKGROUND

A computing environment may employ a messaging system to send, store, and deliver messages between entities within the computing environment, where such entities may include users, processes, and computing devices. In many cases, messaging systems may not scale efficiently and may exhibit degradations in the quality of service as the number of processed messages increases.

Figure 1:
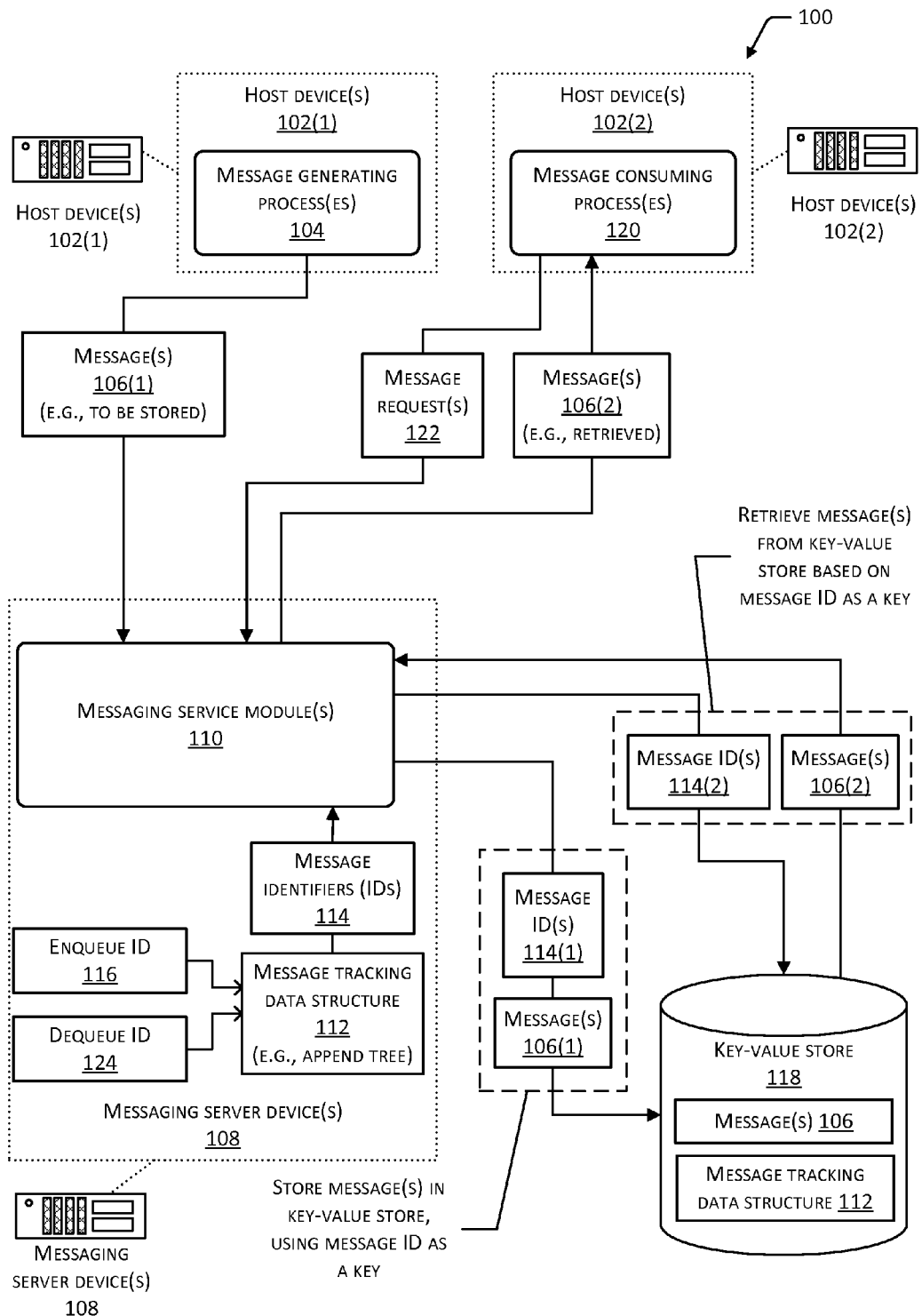
FIG. 1 depicts an environment including one or more messaging server devices for receiving messages, storing the messages in a key-value store, and delivering the messages.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for providing a messaging service that employs a key-value store for storing messages. In implementations, messages may be received from one or more message generating entities, stored in a key-value store, and delivered to one or more message consuming entities. The message generating entities and message consuming entities may include one or more computing devices, one or more processes executing on the computing device(s), or one or more users. In some cases, the messages may carry data that is exchanged between hardware or software components within a computing environment.

Implementations support an Application Programming Interface (API) that includes at least three callable methods: enqueue, dequeue, and ack. The callable methods of the API may be employed by message generating or message consuming entities to request storage, retrieval, or deletion of messages from the key-value store. The enqueue method may be employed by entities to request the storage of a message, and may include the message as a parameter. The dequeue method may be employed by entities to request one of the stored messages, and may return a message along with a message identifier (ID) corresponding to the message. The ack method may be employed by entities to request the deletion or removal of a message from storage, and may include the message ID as a parameter. Table 1 provides example signatures or declarations for the three methods.

TABLE 1 void enqueue (message)
message, message_ID dequeue ( )
void ack (message_ID)

The example method signatures described herein are not limiting of implementations. In some implementations, any of the methods described in Table 1 may include more or fewer parameters or return values. Implementations are also not limited to the examples given herein for method names, parameter names, variable names, and so forth.

In some implementations, the stored messages may be delivered to requesters approximately in an order in which the messages were received and stored. A particular message may be delivered to any number of message consuming entities in response to any number of dequeue requests, until an ack request is received to delete the message from storage. Because the ack request includes the message ID for the message to be deleted, and the message ID is provided with the delivery of the message in response to a dequeue request, the message may not be deleted until it has been delivered to at least one message consuming entity. Accordingly, implementations provide a guaranteed messaging system in which each received message is delivered at least once prior to being deleted.

Implementations support the handling of messages to be stored in any number of queues, and to be delivered (e.g., vended) out of the queue(s). A message may be received in an enqueue request, and the message may include a queue ID indicating a particular queue in which the message is to be stored. In some implementations, a queue may be logically divided into a plurality of partitions and each partition may be managed by a different messaging server device at any particular time. On receiving a message to be stored, a messaging server device may select a partition to be used for managing the message. The messaging server device may access a message tracking data structure that provides a namespace for message identifiers of messages that are managed using the partition. Based on a next available location in the message tracking data structure, a message ID may be designated for the message. The message ID may then be employed as a key to store the message in a key-value store. An enqueue ID may track the next available location in the message tracking data structure, the next available location to be used as a next message ID for storing a subsequently received message. Implementations support the use of any type of data structure for the message tracking data structure. In some implementations, the message tracking data structure is an append tree data structure that is substantially self-balancing and that may be traversed efficiently.

Implementations may also provide a dequeue ID indicating a location in the message tracking data structure corresponding to a message that may be delivered. On receiving a request for a message (e.g., a dequeue request), a message handling device may employ the dequeue ID to determine a message ID corresponding to a message that may be vended to the requesting entity. The message ID may then be used as a key to retrieve the message from the key-value store. On receiving a request to delete a message (e.g., an ack request), the message ID included in the request may be used as a key to remove the message from the key-value store. By employing a key-value store, implementations may provide for a guaranteed messaging service that scales reliably, e.g., that provides an appropriate quality of service as the number of managed messages increases. A key-value store may be any type of data storage in which any amount of data (e.g., any number of bytes of data) is stored and associated with a key of any size or data type. The key-value store described herein may include, but is not limited to, an associative array, a map, a table, a hash map, a hash table, and so forth. In some implementations, the key-value store may comprise at least a portion of the file system on one or more computing devices. In such cases, the file name of a file may be employed as the key to access the contents of the file stored in the file system, and the files may store the messages.

FIG. 1 depicts an environment 100 in which implementations may operate to receive messages, store messages in a key-value store, and deliver messages. As shown in FIG. 1, the environment 100 may include one or more host devices 102. The host device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the host devices 102 may comprise a cluster, cloud, farm, or other grouping of multiple devices that coordinate operations to provide load balancing, failover support, parallel processing capabilities, shared storage resources, or other aspects. Although examples herein may describe the host devices 102 as physically separate devices, implementations are not so limited. In some cases, the host devices 102 may be a plurality of virtual computing environments, hypervisors, device emulations, or virtual machines executing on one or more physical computing devices. The host device(s) 102 are described further with reference to FIG. 4.

The host device(s) 102 may include host device(s) 102(1) that execute one or more message generating processes 104. The message generating process(es) 104 may generate one or more message(s) 106(1) to be stored and vended as described herein. The message(s) 106(1) may be sent to one or more messaging server devices 108. In some cases, the message(s) 106(1) may be sent in one or more enqueue requests that each includes a message 106(1) as a parameter as described above. The messaging server device(s) 108 may be any type of computing device, including but not limited to those types of computing devices described with reference to the host device(s) 102. In some cases, two or more of the messaging server devices 108 may comprise a cluster, cloud, farm, or other grouping of multiple devices that coordinate operations to provide load balancing, failover support, parallel processing capabilities, shared storage resources, or other aspects. The messaging server device(s) 108 are described further with reference to FIG. 5.

The messaging server device(s) 108 may execute one or more messaging service modules 110. The messaging service module(s) 110 may perform operations to analyze the message(s) 106(1), store the message(s) 106(1) in a key-value store, track the message(s) 106(1), respond to requests for the message(s) 106(1), and remove the message(s) 106(1) from the key-value store. For example, the messaging service module(s) 110 may process and respond to enqueue, dequeue, and ack requests regarding the message(s) 106(1). Operations of the messaging service module(s) 110 are described further with reference to FIGS. 6-9.

In some implementations, the messaging service module(s) 110 may employ a message tracking data structure 112 to track the messages handled by the messaging service module(s) 110, and to determine a message ID 114 for each of the received message(s) 106(1). Implementations support any type of data structure for the message tracking data structure 112, including but not limited to a table, a list (e.g., a linked list), a tree (e.g., a binary search tree), and so forth. In some implementations, the message tracking data structure 112 may be an append tree data structure that is substantially self-balancing. The append tree data structure is described further with reference to FIGS. 10-15. In some implementations, the message tracking data structure 112 may be in active or runtime memory (e.g., not written to disk) on the messaging server device(s) 108 to enable efficient access to the message tracking data structure 112.

The messaging server device(s) 108 may also include, in memory, an enqueue ID 116 that indicates an available location (e.g., a next available location) in the message tracking data structure 112 for tracking message(s) 106. In some implementations, the enqueue ID 116 is a message ID 114 for the next message 106 to be stored in the key-value store 118, and the message ID 114 is the file name under which the message 106 may be stored in the key-value store 118. On receiving an enqueue request with a message 106(1) to be stored and vended, the messaging service module(s) 110 may employ the enqueue ID 116 to determine an available location in the message tracking data structure 112. A message ID 114 corresponding to the message 106(1) may be generated based on the available location in the message tracking data structure 112. The message 106(1) may be stored in a key-value store 118 using the message ID 114 as a key, as shown in FIG. 1. The enqueue ID 116 may be advanced to a next available location in the message tracking data structure 112, in preparation for receiving a next message 106(1) to be stored.

In some implementations, the message tracking data structure 112 may be built up and created in memory on the messaging server device(s) 108, and a copy of the message tracking data structure 112 may also be stored in the key-value store 118. The stored copy of the message tracking data structure 112 may enable message tracking to continue on another messaging server device 108 after the messaging server device 108 fails (e.g., crashes), or when the management of a queue partition associated with the message tracking data structure 112 passes from one messaging server device 108 to another messaging server device 108, as described further with reference to FIG. 2.

In some implementations, where the key-value store 118 is at least a portion of the file system of the messaging server device(s) 108, the message ID 114 may be employed as a file name to store the message 106 in a file within the key-value store 118. Accordingly, the message tracking data structure 112 may be employed as a namespacing tool to determine the file name under which to store the message 106.

The key-value store 118 may include any number of data storage devices or data storage services executing on any number of computing devices. Implementations support the use of any type of key-value store 118 for storing message(s) 106. In some cases the key-value store 118 may be managed using an implementation of the Dynamo structured storage system, such as the Apache Cassandra™ database management system provided by the Apache Software Foundation. In some cases, the key-value store 118 may be managed using DynamoDB, developed at Amazon.com™ of Seattle, Wash., USA. Implementations also support other types of the key-value store 118, including NoSQL data storage systems or databases such as an associative array, a map, a table, a hash map, a hash table, and so forth.

As shown in FIG. 1, the host device(s) 102 may also include host device(s) 102(2) that execute one or more message consuming processes 120. The message consuming process(es) 120 may send one or more message requests 122 to the messaging server device(s) 108, each message request 122 requesting the delivery of a message 106 that is stored in the key-value store 118. The message request(s) 122 may be dequeue requests as described above. On receiving a message request 122, the messaging service module(s) 110 may access a dequeue ID 124 that indicates a location in the message tracking data structure 112 corresponding to the message ID 114 for a message 106(2) that may be vended. Based on the dequeue ID 124, a message ID 114 may be determined corresponding to the location in the message tracking data structure 112. A message 106(2) may then be retrieved from the key-value store 118, using the message ID 114 as a key. The retrieved message 106(2) may then be sent to the message consuming process 120 that sent the message request 122. The dequeue ID 124 may be advanced to a next location in the message tracking data structure 112, in preparation for receiving a next message request 122 for a message 106(2) to be vended (e.g., sent to a message consuming process 120). In some implementations, the enqueue ID 116 and the dequeue ID 124 may be strings that are maintained in memory (e.g., in active memory) and that include the message IDs 114 for the next messages 106 that may be enqueued and dequeued respectively.

Although not shown in FIG. 1, the messaging service module(s) 110 may also perform operations to respond to requests to delete message(s) 106 stored in the key-value store 118. For example, the message generating process(es) 104, the message consuming process(es) 120, or other entities may send an ack message that includes a message ID 114 as a parameter. The messaging service module(s) 110 may employ the message ID 114 as a key to delete the corresponding message 106 from the key-value store 118.

Although the host device(s) 102(1) (e.g., message generating devices) and the host device(s) 102(2) (e.g., message consuming devices) are depicted in FIG. 1 as separate devices, implementations are not so limited. In some cases one or more host devices 102 may operate as both message generating devise and message consuming devices, and may execute both message generating process(es) 104 and message consuming process(es) 120. Moreover, in some cases, one or more processes may operate as both a message generating process 104 and a message consuming process 120.

Figure 2:
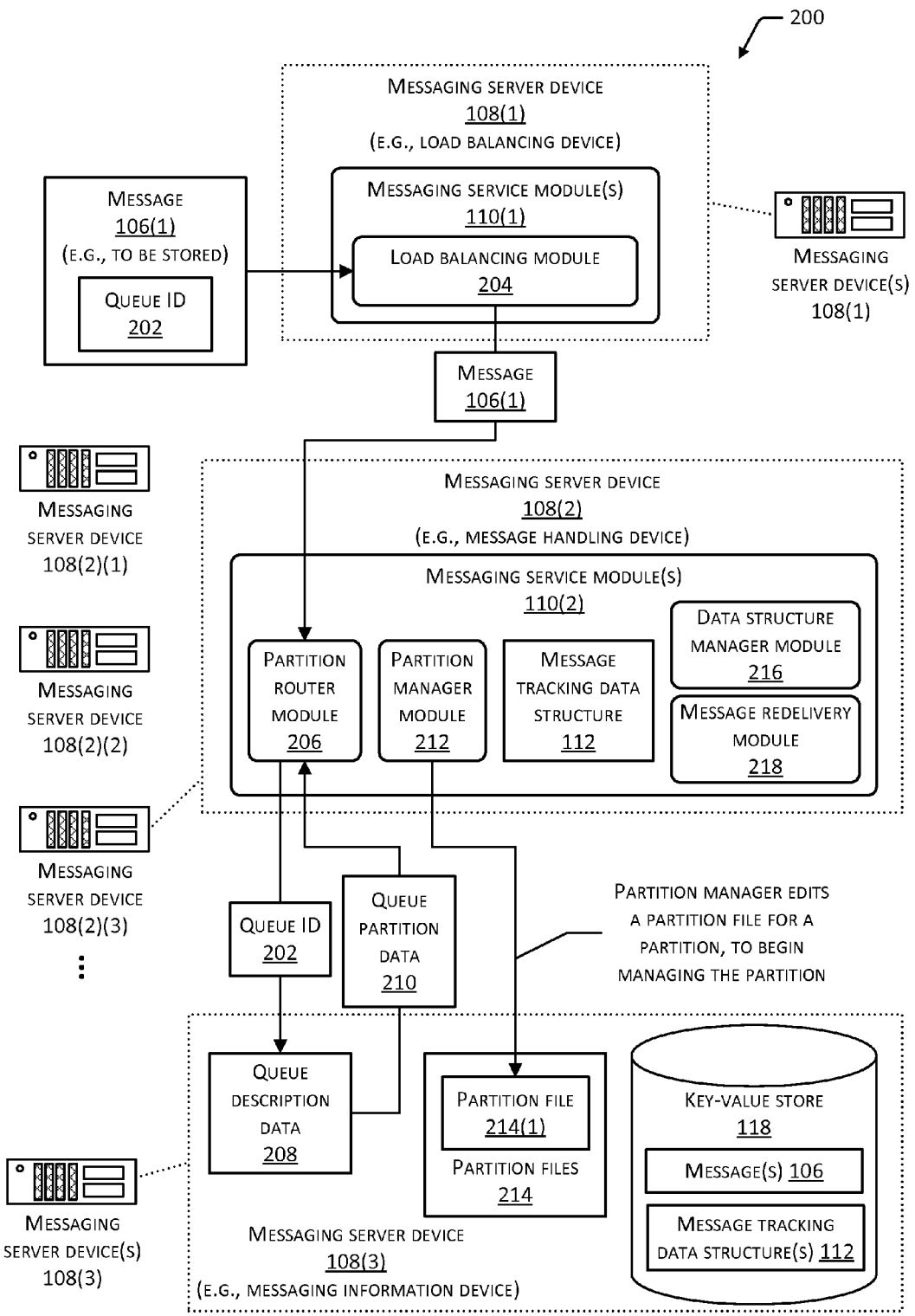
FIG. 2 depicts an environment including one or more load balancing devices for distributing received messages among a plurality of message handling devices, each message handling device managing messages in a partition of a message queue using a message tracking data structure.

Although FIG. 1 depicts examples in which a same set of one or more messaging server device(s) 108 performs operations for storing and vending messages 106, implementations are not so limited. In some implementations, the operations of the messaging server device(s) 108 may be distributed among multiple computing devices that perform various operations. For example, FIG. 2 depicts an environment 200 in which a messaging server device 108(1) operates as a load balancing device, distributing received messages 106(1) to be handled by a plurality of messaging server devices 108(2) that operate as message handling devices. In some cases, the messaging server devices 108(2) may be physically separate computing devices. Alternatively, the messaging server devices 108(2) may be separate virtual servers such as hypervisors, virtual machines, emulations, and so forth executing on one or more computing devices.

In the example of FIG. 2, the received message(s) 106(1) may each include a queue ID 202 that identifies a queue for storing the message 106(1). In some implementations, message(s) 106 may be received to be stored in a plurality of queues. Such queues may correspond to various business or technical operations within an organization. For example, a first queue may be employed to track message(s) 106 that each triggers a notification to be sent to a user (e.g., via email, text message, and so forth). A second queue may be employed to track message(s) 106 that each triggers an addition of one or more records to a database.

The messaging server device 108(1) (e.g., the load balancing device) may execute one or more messaging service modules 110(1) that include a load balancing module 204. On receiving the message 106(1), the load balancing module 204 may determine one of a plurality of messaging server devices 108(2) (e.g., message handling devices) to handle (e.g., store and/or vend) the message 106(1). In some cases, the selection of the messaging server device 108(2) may be random or may employ a round-robin load balancing algorithm to distribute the incoming message(s) 106(1) substantially uniformly among the plurality of messaging server devices 108(2).

In some implementations, each of the messaging server devices 108(2) may manage message(s) 106 in a logical partition of the queue identified by the queue ID 202. The messaging server device(s) 108(2) may execute messaging service module(s) 110(2) that include a partition router module 206. If the partition router module 206 is not executing when the message 106(1) is received, an instance of the partition router module 206 may be created and executed. The partition router module 206 may perform operations to determine a partition of the queue to be managed by the messaging server device 108(2) that received the message 106(1). To determine a partition, the partition router module 206 may access queue description data 208 that describes the logical partitions associated with one or more queues. Based on the queue ID 202, the partition router module 206 may retrieve, from the queue description data 208, queue partition data 210 that describes the one or more partitions associated with the queue.

As shown in the example of FIG. 2, the queue description data 208 may be stored on a messaging server device 108(3) that operates as a messaging information device. Alternatively, the queue description data 208 may be stored on the messaging server device(s) 108(2). The queue partition data 210 may include a list of logical partitions associated with a queue. For example, for queue ID 202="Q13" the queue partition data 210 may be "Q13:{p0, p1, p2, p3, p4}", indicating that the Q13 queue has five partitions designated as p0, p1, p2, p3, and p4. In some cases, the queue partition data 210 for a particular queue may be a particular file among a plurality of files in the queue description data 208. Based on the queue partition data 210, the partition router module 206 may select one of the partitions of the queue identified by the queue ID 202, if the messaging server device 108(2) is not currently handling a partition. In some cases, the selection may be random. The partition router module 206 may also select one or more backup partitions in case the selected partition is already managed by another messaging server device 108(2).

The partition router module 206 may execute an instance of the partition manager module 212 to manage the partition. The partition manager module 212 may enable the messaging server device 108(2) to manage the partition, e.g., to take ownership of the partition or to achieve a lock on the partition. In some cases the messaging server device 108(2) may manage the partition for a predetermined period of time (e.g., 10 seconds). To begin managing the partition, the partition manager module 212 may access partition files 214, and open a particular partition file 214(1) corresponding to the selected partition. The partition manager module 212 may edit the partition file 214(1) to establish ownership of the partition. As shown in FIG. 2, the partition files 214 may be stored on the messaging server device 108(3). Alternatively, the partition files 214 may be stored on the messaging server devices 108(2) or elsewhere. Moreover, in some implementations the key-value store 118 may be incorporated into the messaging server device 108(3) or into one or more of the messaging server devices 108(2).

As shown in the example of FIG. 2, in some implementations a same set of one or more messaging server devices 108(3) may include the queue description data 208, the partition files 214, and the key-value store 118. The key-value store 118 may store the message(s) 106 and the message tracking data structure(s) 112 corresponding to one or more partitions. In some implementations, one or both of the queue description data 208 and the partition files 214 may also be stored in the same key-value store 118 as the messages 106. In some cases, the key-value store 118 may be at least a portion of the file system of the messaging server device(s) 108(3), in which any number of files may be stored and the file names of the files may be employed as keys to access the files. In some implementations, the key-value store 118 may be a distributed key-value store 118 that is distributed among any number of the messaging server devices 108(3). For example, the key-value store 118 may include at least a portion of the file system of multiple messaging server devices 108(3). Such a distribution of the key-value store 118 may enable scalability of the messaging service.

In some cases, the partition router module 206 may receive an ack request to delete a message 106, the ack request specifying the message ID 114 of the message 106 to be deleted. Based on the message ID 114, the partition router module 206 may determine that the message 106 is associated with a partition currently being managed by another messaging server device 108(2). The partition router module 206 may then forward the ack request to the other messaging server device 108(2) that is currently managing the partition.

In some cases, an enqueue message including the message 106(1) may be sent to a messaging server device 108(2) that is currently managing a partition. The partition router module 206 on the messaging server device 108(2) may forward the request to another messaging server device 108(2) that is not currently managing a partition instead of handling the message 106(1) on the local messaging server device 108(2), if there is at least one other messaging server device 108(2) that is not currently managing a partition. Otherwise, the local messaging server device 108(2) may handle the message 106(1). In this way, implementations may mitigate the chances of a greedy load balancing in which a particular messaging server device 108(2) may handle a disproportionate number of messages 106 compared to other messaging server devices 108(2).

In some cases, the partition router module 206 may initiate a cooling period on the messaging server device 108(2) on which the petition router module 206 is executing. During the cooling period, received enqueue requests may be routed to another messaging server device 108(2), while received dequeue requests may be handled locally. The partition router module 206 may initiate the cooling period based on information received from the partition manager module 212. For example, a cooling period may be initiated based on the number of currently handled messages 106 being higher than a predetermined threshold, or based on a failure rate being higher than a predetermined threshold. Implementations also support the use of any other routing techniques to distribute incoming messages 106 among the messaging server devices 108(2).

Figure 3:
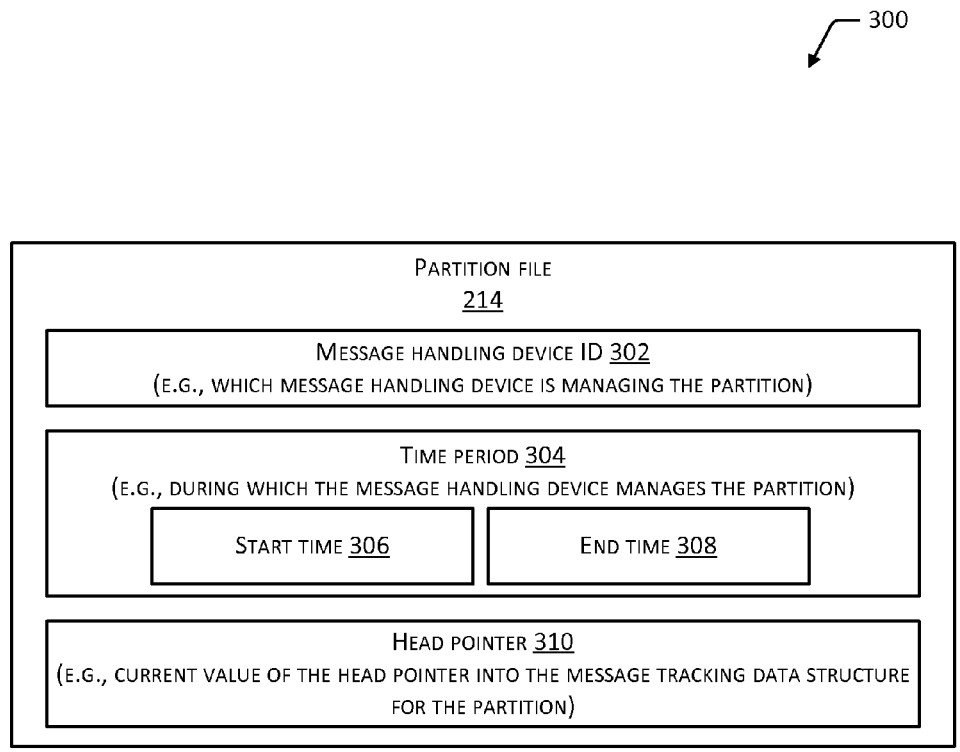
FIG. 3 depicts a schematic of an example partition file that includes information for managing a partition of a message queue.

FIG. 3 depicts a schematic 300 of an example of the partition file 214 that includes information for managing a partition of a queue. The partition file 214 may include a message handling device ID 302, indicating which messaging server device 108(2) (if any) is currently managing the partition (e.g., owns or has a lock on the partition). A message handling device ID 302 that is null or empty may indicate that the partition is not currently being managed by a messaging server device 108(2). The partition file 214 may also include a time period 304 during which the partition is being managed by the messaging server device 108(2) identified in the message handling device ID 302. In some implementations, the time period 304 may include a start time 306 and an end time 308 for the time period 304. The start time 306 and the end time 308 may be time stamps that include both time and date information. Alternatively, the time period 304 may indicate the duration of a time period during which a partition is being managed by a messaging server device 108(2), and may not include an indication of the start time 306 and end time 308 of that time period 304. In some implementations, the partition file 214 may include a head pointer 310, indicating a most recently allocated block of the message tracking data structure 112 that has been instantiated to manage message IDs 114 for messages 106 in the partition. In some implementations, the head pointer 310 may be a name of the block file for the most recently allocated block for the message tracking data structure 112, the block file being stored in the key-value store 118 (e.g., in the file system of the messaging server device(s) 108(3)).

Returning to FIG. 2, the partition manager module 212 may analyze the partition file 214(1) for the selected partition of the queue. If the message handling device ID 302 in the partition file 214(1) is not null, the partition manager module 212 may wait for the time period 304 to expire before attempting again to establish a lock on the partition. In some implementations, the partition manager module 212 may save data indicating a time when the partition manager module 212 last attempted to access the partition file 214. After a particular time period from the last attempt, the partition manager module 212 may reattempt the lock. In some cases, the time period before the reattempt may be the entire time period 304. For example, a clock on the messaging server device 108(2) executing the partition manager module 212 may indicate that the current time is 10:30:33, and the time period 304 may be 10 seconds. The partition manager module 212 may, in 10 seconds, attempt to claim ownership of the partition (e.g., at 10:30:43). In this way, implementations may ensure that two or more messaging server devices 108(2) may not take a lock on the same partition in cases where the clocks of the messaging server devices 108(2) indicate a different current time (e.g., in case of clock skew between devices having uncoordinated clocks). Alternatively, in some implementations the clocks of the messaging server devices 108(2) may be substantially synchronized to reduce the likelihood that two or more messaging server devices 108(2) may attempt to take a lock on a same partition. In such cases, the time period 304 may include an expiration time stamp.

To establish a lock on the partition and begin managing the partition, the partition manager module 212 may edit the partition file 214(1) to identify the messaging server device 108(2) in the message handling device ID 302. The partition manager module 212 may also create a new instance of the message tracking data structure 112 in memory (e.g., in active, runtime memory) on the messaging server device 108(2) by instantiating a first block of the message tracking data structure 112. The message tracking data structure 112 may also be stored in the key-value store 118, and the head pointer 310 may be edited to indicate the file name of the new block file of the newly instantiated message tracking data structure 112. The partition manager module 212 may also edit the time period 304.

Having established a lock on the partition, the partition manager module 212 may determine a message ID 114 for the received message 106(1), and employ the message ID 114 as a key to store the message 106(1) in the key-value store 118. In some implementations, the message tracking data structure 112 is an append tree data structure in which each node of the append tree is a block in memory, and the block may include a plurality of positions (e.g., 128 positions) each corresponding to a message ID 114. The partition manager module 212 may determine an available location in the append tree (e.g., a position in a block of the append tree) corresponding to the message ID 114 for the message 106(1), and advance the enqueue ID 116 to a next location in the append tree. Employing the append tree data structure to track message IDs 114 is described further with reference to FIG. 15.

In some implementations, the message ID 114 may be a string that comprises:

a partition name, including a queue name and a partition number for the partition within the queue;

a block start address, indicating the start address in memory of the block of the append tree corresponding to the message ID 114;

a block size, indicating a size of the block;

a random number, to prevent two instances of the partition manager module 212 from writing to a same block; and a message index, indicating a position within the block.

On receiving additional enqueue request(s) with additional message(s) 106(1), the messaging server device 108(2) may determine message IDs 114 for the message(s) 106(1) based on the message tracking data structure 112 and store the message(s) 106(1) in the key-value store 118 based on the message IDs 114. The partition manager module 212 may advance the enqueue ID 116 for each stored message 106(1), and update the head pointer 310 in the partition file 214 as new blocks are allocated to track messages 106 using the message tracking data structure 112. In some implementations, the head pointer 310 may indicate the block file name for the most recently allocated block of the message tracking data structure 112.

The messaging server device 108(1) (e.g., the load balancing device) may also route dequeue and ack requests to the messaging server devices 108(2), to substantially balance the load of responding to such requests. On receiving a dequeue request such as the message request 122, the partition manager module 212 may access the message tracking data structure 112 to determine a message ID 114 corresponding to a current value of the dequeue ID 124, and retrieve the message 106(2) from the key-value store 118 based on the message ID 114. The partition manager module 212 may send the message 106(2) to the message consuming process 120 that sent the dequeue request, and advance the dequeue ID 124. If the partition manager module 212 determines that there are currently no messages 106 to vend from the partition (e.g., based on the dequeue ID 124 being set to an initial value), the partition manager module 212 may forward the dequeue request to another messaging server device 108(2).

On receiving an ack request that includes a message ID 114, the partition manager module 212 may examine the message ID 114 and determine whether it corresponds to a partition that is currently owned by the partition manager module 212. If not, the partition manager module 212 may examine the partition files 214 to determine which messaging server device 108(2) is currently managing the partition (e.g., based on the message handling device ID 302), and forward the ack request to the appropriate messaging server device 108(2). If the partition manager module 212 is currently managing the partition identified in the message ID 114, the partition manager module 212 may employ the message ID 114 to delete the message 106 from the key-value store 118. The partition manager module 212 may also remove the reference to the message ID 114 from its location in the message tracking data structure 112.

In some implementations, the messaging service module(s) 110(2) executing on the messaging server device 108(2) (e.g., the message handling device) may also include a data structure manager module 216 and a message redelivery module 218. The data structure manager module 216 may perform operations to manage the message tracking data structure 112 on the messaging server device 108(2). For example, if the partition manager module 212 requests a new message ID 114 from the message tracking data structure 112 and no location is currently available in the message tracking data structure 112, the partition manager module 212 may allocate a new block in memory and add the new block to the message tracking data structure 112. This process is described further with reference to FIGS. 10-15. The partition manager module 212 may also perform cleanup operations to remove blocks for which all the message IDs 114 identify messages 106 that have been deleted (e.g., in response to ack requests).

The message redelivery module 218 may manage the redelivery of messages 106 that have been delivered in response to dequeue requests but that have not yet been deleted in response to an ack request. In some implementations, the message redelivery module 218 may maintain two data structures (e.g., two tree structures): one organized by message IDs 114 and the other organized by time. Following the delivery of a message 106 in response to a dequeue request, the message ID 114 may be moved from one location to another in the time-based data structure, to ensure that the same message 106 is not redelivered immediately in response to another dequeue request. Following a dequeue request, the dequeue ID 124 may be advanced to a next message ID 114 based on information in the time-based data structure for redelivery. The ID-based data structure may include a reference into the time-based data structure for each message 106 that is available for redelivery. The ID-based data structure may be sorted by message ID 114, enabling a particular node to be reached efficiently for a particular message ID 114. On receiving an ack request for a message ID 114, the ID-based data structure may be employed to determine the location of the message ID 114 in the time-based data structure, and the nodes corresponding to the message 106 to be deleted may be removed from both the time-based and ID-based data structures.

When the lock on a partition that is held by a first messaging server device 108(2) expires, or when the first messaging server device 108(2) that is managing the partition crashes or otherwise fails, a second messaging server device 108(2) may take a lock on the partition and begin handling messages 106 within that partition. In such cases, the second messaging server device 108(2) may establish a lock on the partition as described above. The second messaging server device 108(2) may copy the message tracking data structure 112 from the messaging server device(s) 108(3) into memory on the second messaging server device 108(2) beginning with the head block of the message tracking data structure 112, the head block indicated by the head pointer 310 included in the partition file 214. Having copied the head block into memory, the second messaging server device 108(2) may begin enqueuing newly received messages 106 into the head block. The second messaging server device 108(2) may then traverse the message tracking data structure 112, copying each block into memory until it reaches the oldest block. The second messaging server device 108(2) may then begin providing messages 106 in response to dequeue requests.

The various devices of the environments 100 and 200 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100 and 200 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 4:
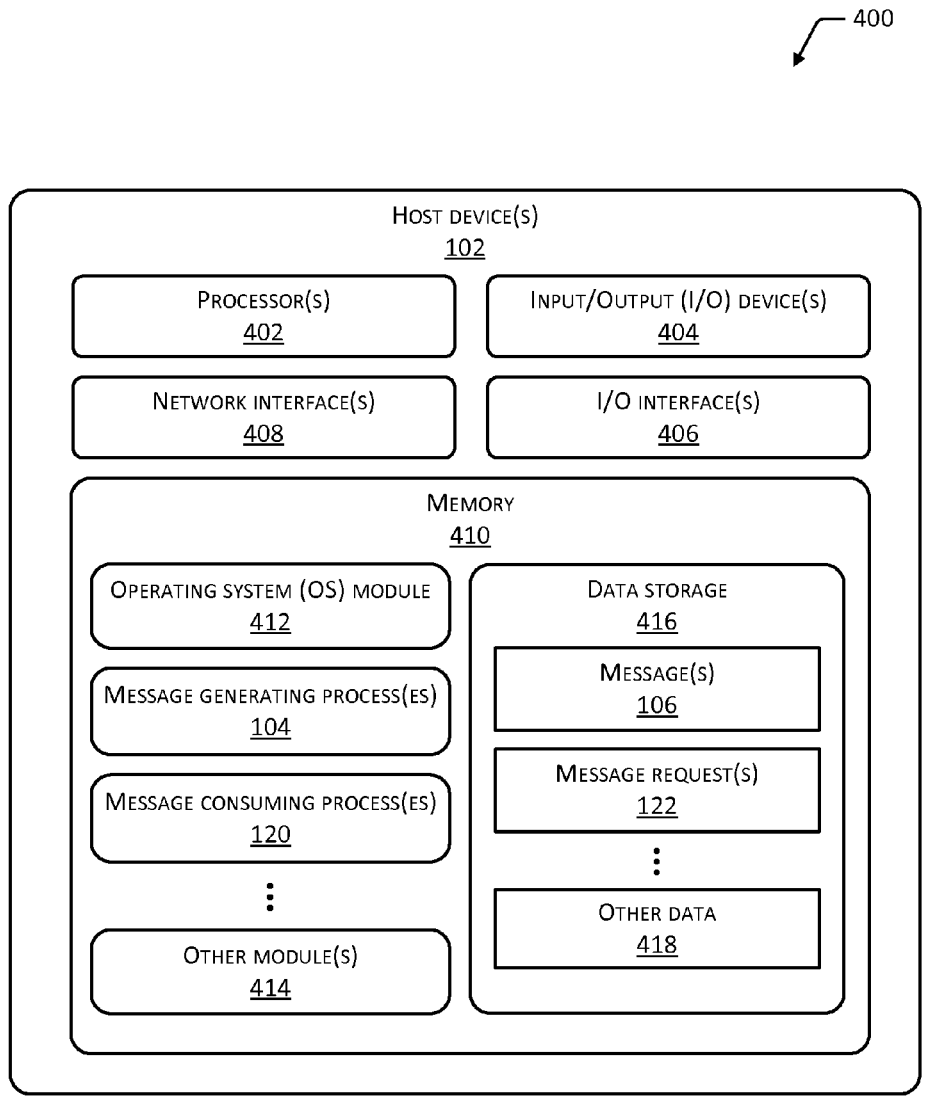
FIG. 4 depicts a block diagram of an example host device that may generate or consume messages.

FIG. 4 depicts a block diagram 400 of an example of the host device(s) 102. As shown in the block diagram 400, the host device 102 may include one or more processors 402 configured to execute one or more stored instructions. The processor(s) 402 may comprise one or more cores.

The host device 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the host device 102, or may be externally placed.

The host device 102 may include one or more I/O interfaces 406 to enable components or modules of the host device 102 to control, interface with, or otherwise communicate with the I/O device(s) 404. The I/O interface(s) 406 may enable information to be transferred in or out of the host device 102, or between components of the host device 102, through serial communication, parallel communication, or other types of communication. For example, the I/O interface(s) 406 may comply with a version of the RS-232 standard for serial ports, or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The host device 102 may also include one or more busses or other internal communications hardware or software that allow for the transfer of data between the various modules and components of the host device 102.

The host device 102 may include one or more network interfaces 408 that enable communications between the host device 102 and other network accessible computing devices, such as the messaging server device(s) 108. The network interface(s) 408 may include one or more network interface controllers (NICs) or other types of transceiver devices configured to send and receive communications over a network.

The host device 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the host device 102. In some implementations, the memory 410 may provide storage of computer-readable instructions or other information in a non-transitory format.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux® operating system; any version of iOS™ from Apple® Corp. of Cupertino, Calif., USA; any version of Windows® or Windows Mobile® from Microsoft® Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS® from Research In Motion™ Ltd. of Waterloo, Ontario, Canada; any version of VxWorks™ from Wind River Systems™ of Alameda, Calif., USA; or other operating systems.

The memory 410 may include one or more of the modules described above as executing on the host device 102, such as the message generating process(es) 104 and the message consuming process(es) 120. The memory 410 may also include one or more other modules 414, such as a user authentication module or an access control module to secure access to the host device 102, and so forth.

The memory 410 may include data storage 416 to store data for operations of the host device 102. The data storage 416 may comprise a database, array, structured list, tree, or other data structure, and may be a relational or a non-relational datastore. The data storage 416 may store data such as that described above, including one or more of the message(s) 106 or the message request(s) 122. The data storage 416 may also store other data 418, such as user authentication information or access control data. In some implementations, at least a portion of the information stored in the data storage 416 may be stored externally to the host device 102, on other devices that may communicate with the host device 102 via the I/O interface(s) 406 or via the network interface(s) 408.

Figure 5:
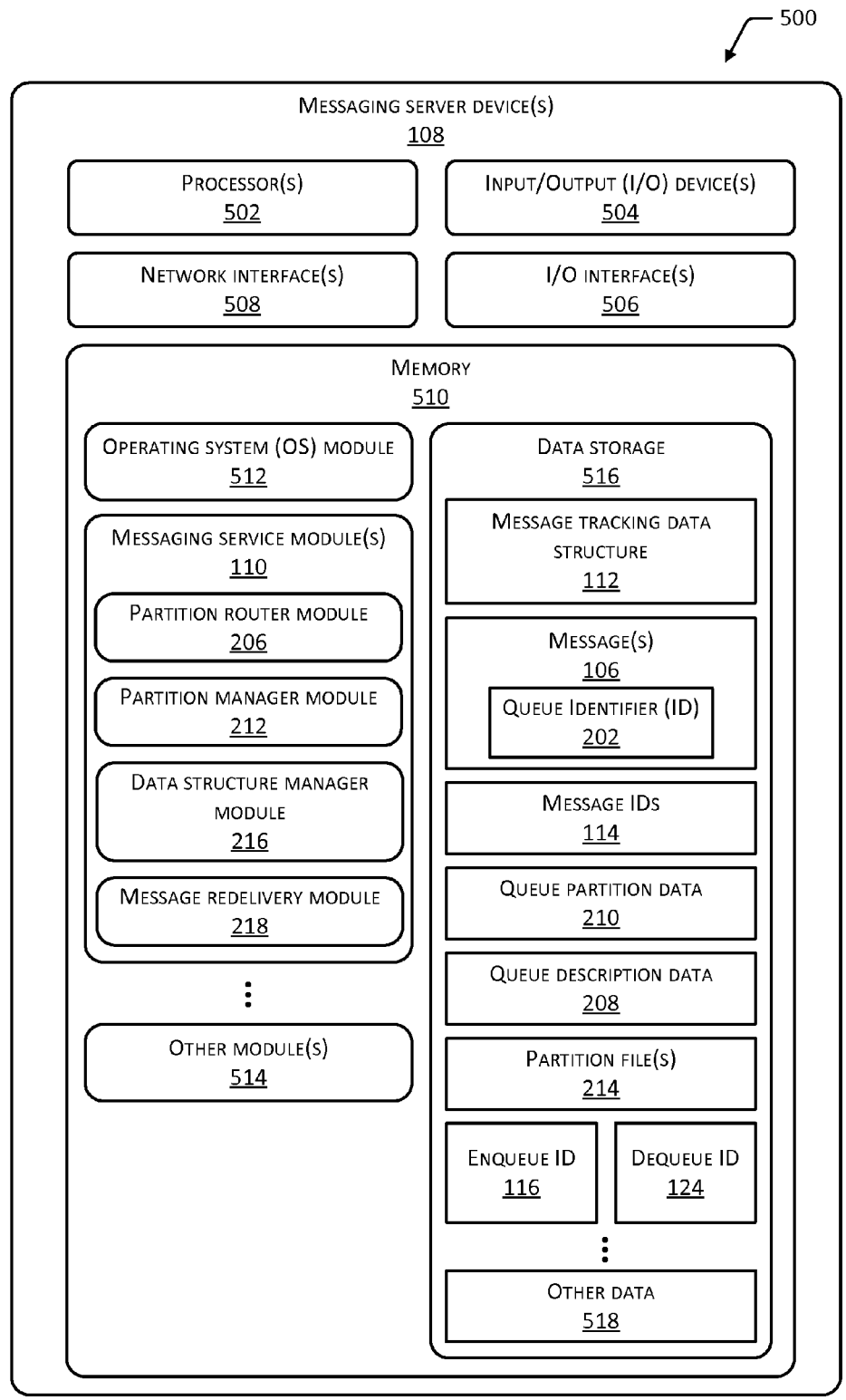
FIG. 5 depicts a block diagram of an example messaging server device configured to receive messages, store the messages in a key-value store, and deliver the messages.

FIG. 5 depicts a block diagram 500 of an example of the messaging server device(s) 108. As shown in the block diagram 500, the messaging server device(s) 108 may include one or more processors 502 configured to execute one or more stored instructions. The processor(s) 502 may comprise one or more cores. The messaging server device(s) 108 may include one or more I/O devices 504, one or more I/O interfaces 506, and one or more network interfaces 508 as described above respectively with reference to the I/O device(s) 404, the I/O interface(s) 406, and the network interface(s) 408.

The messaging server device(s) 108 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the modules described above as executing on the messaging server device(s) 108, such as the messaging service module(s) 110, the partition router module 206, the partition manager module 212, the data structure manager module 216, and the message redelivery module 218. The memory 510 may also include one or more other modules 514, such as a user authentication module or an access control module to secure access to the messaging server device(s) 108, and so forth.

The memory 510 may include data storage 516 to store data for operations of the messaging server device(S) 108. The data storage 516 may comprise a database, array, structured list, tree, or other data structure, and may be a relational or a non-relational datastore. The data storage 516 may include data that is in active memory on the messaging server device(s) 108, or data that is written to a hard drive, disk, or other non-volatile storage on the messaging server device(s) 108. The data storage 516 may store data such as that described above, including one or more of the message tracking data structure 112, the message(s) 106, the queue ID 202, the message IDs 114, the queue partition data 210, the queue description data 208, the partition files 214, the enqueue ID 116, or the dequeue ID 124. The data storage 516 may also store other data 518, such as user authentication information or access control data. In some implementations, at least a portion of the information stored in the data storage 516 may be stored externally to the messaging server device(s) 108, or other devices that may communicate with the messaging server device(s) 108 via the I/O interface(s) 506 or via the network interface(s) 508.

Figure 6:
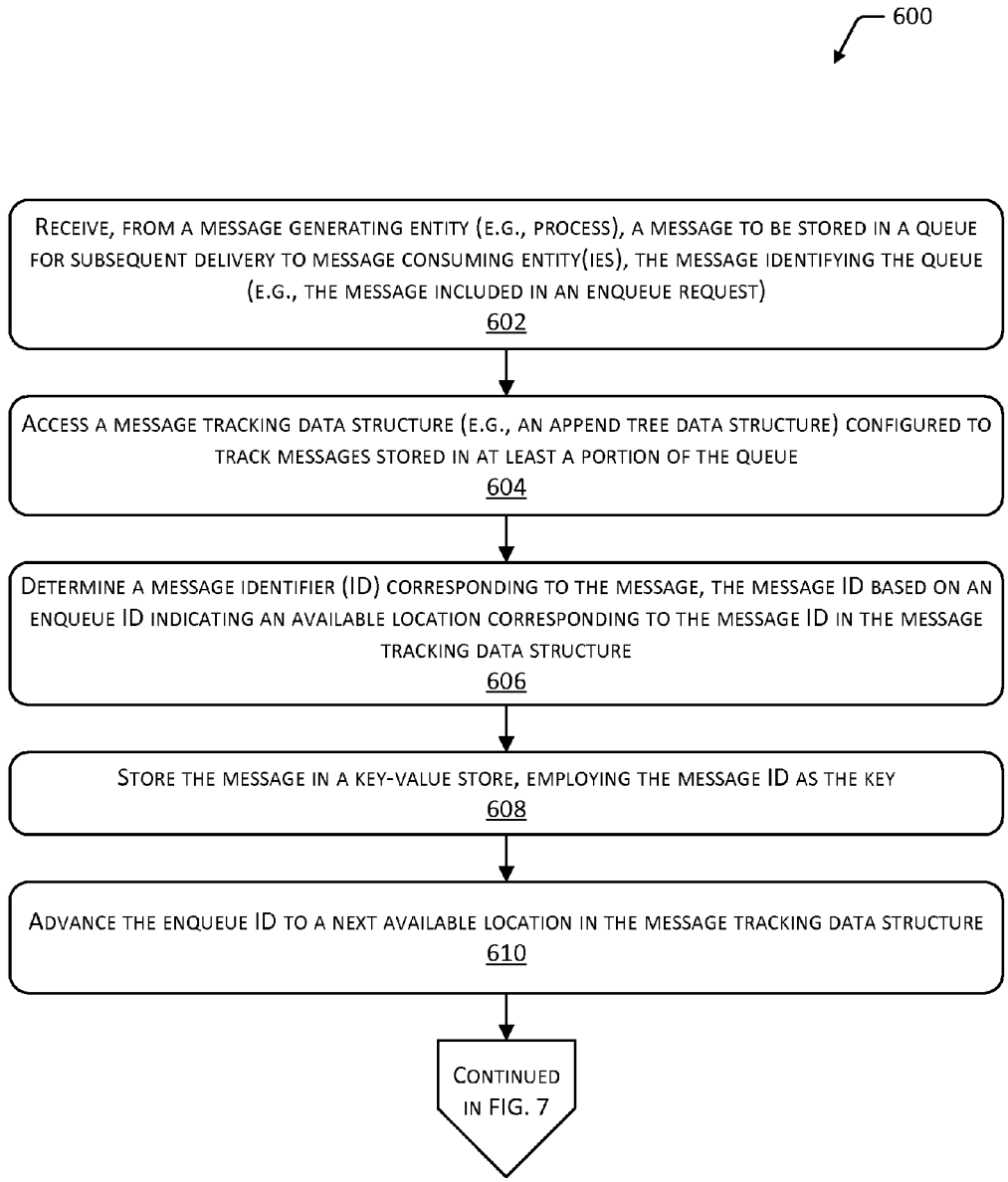
FIG. 6 depicts a flow diagram of a process for receiving a message associated with a queue, and storing the message in a key-value store based on a message identifier that is determined using a message tracking data structure associated with at least a portion of the queue.

FIG. 6 depicts a flow diagram 600 of a process for receiving a message 106 associated with a queue, and storing the message 106 in the key-value store 118 based on the message ID 114. The message ID 114 for storing the message 106 may be determined using the message tracking data structure 112 associated with at least a portion (e.g., a partition) of the queue. One or more operations of the process may be performed by the messaging service module(s) 110, by other modules executing on the messaging server device(s) 108, or by modules executing on other devices.

At 602, a message 106 is received from a message generating process 104 or another message generating entity such as a computing device or a user. The message 106 may be sent in an enqueue request indicating that the message 106 is to be stored in a queue for subsequent delivery to one or more message consuming processes 120, or other message consuming entities such as computing devices or users. The queue for storage may be indicated by a queue ID 202 included in the message 106. Alternatively, the queue may be determined based on the particular message generating entity that sent the message 106.

At 604, the message tracking data structure 112 may be accessed. As described above, the message tracking data structure 112 may be configured to track a plurality of messages 106 stored in at least a portion of the queue. In cases where there is no instance of the message tracking data structure 112 present, an instance may be created. In some implementations, the message tracking data structure 112 may be an append tree data structure, as described further with reference to FIGS. 10-14.

At 606, a message ID 114 may be determined for the message 106. As described above, the message ID 114 may be determined based on an available location in the message tracking data structure 112, and the available location may be indicated by the enqueue ID 116. At 608, the message 106 may be stored in the key-value store 118 using the determined message ID 114 as a key.

As described above, in some implementations the message tracking data structure 112 may be immutable in that the data stored in each block of the message tracking data structure 112 may not be altered after the block has been allocated in memory and added to the message tracking data structure 112. In such cases, blocks of the message tracking data structure 112 may be employed to allocate namespaces for the message indexes to be used in the message IDs 114. The message IDs 114 may then be employed as file names to store the message(s) 106 in the key-value store 118. Accordingly, the blocks themselves may not store the message IDs 114 for the tracked message(s) 106. Alternatively, in some implementations each of the blocks may store the message IDs 114 in one or more positions within the block.

At 610, the enqueue ID 116 may be advanced to indicate a next available location in the message tracking data structure 112. In some implementations, the enqueue ID 116 is the message ID 114 that identifies the message 106. The message ID 114 may also be added to the two data structures maintained by the message redelivery module 218 to manage one or more potential redeliveries of the message 106. The process may continue as described with reference to FIG. 7.

Figure 7:
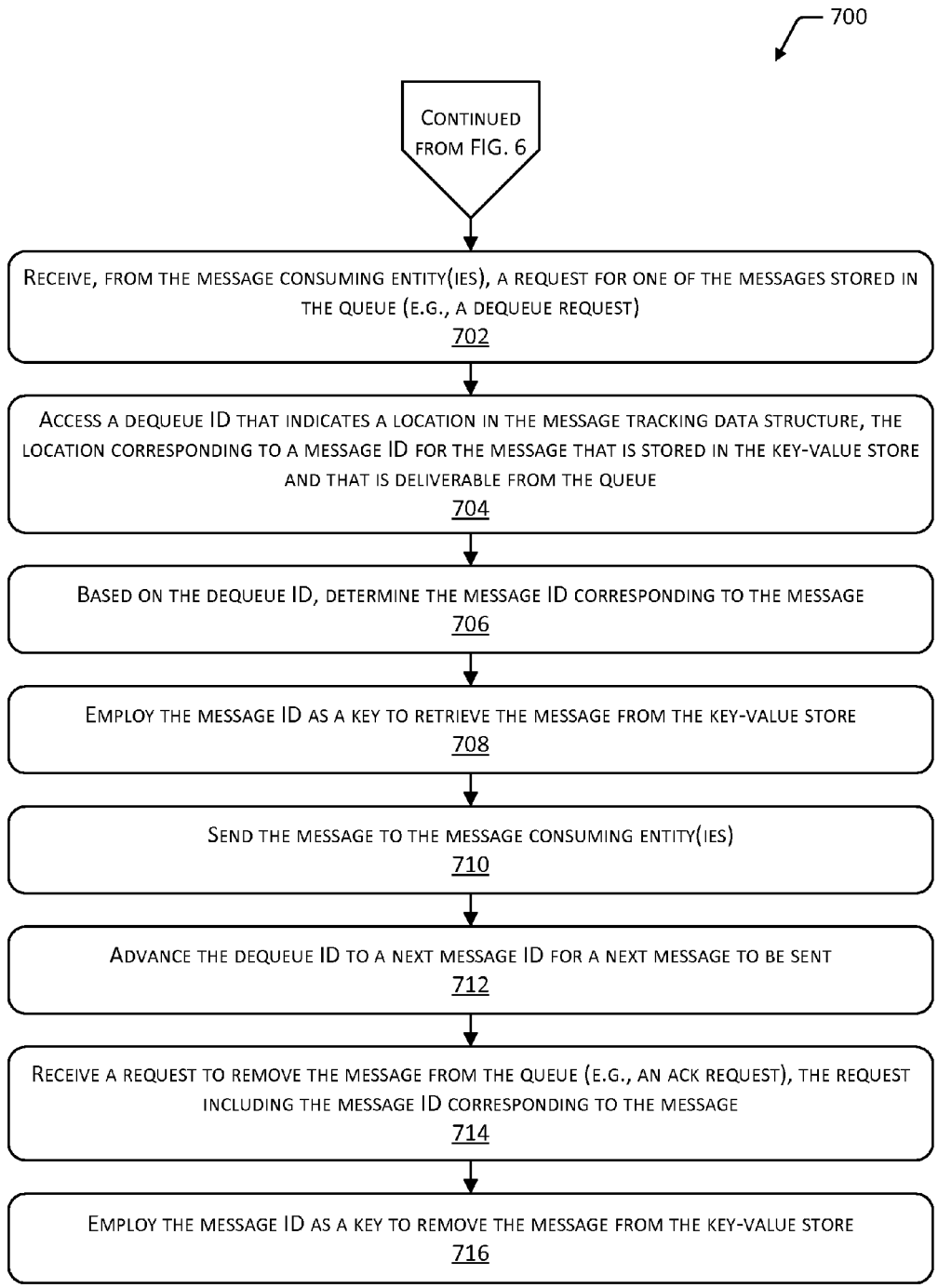
FIG. 7 depicts a flow diagram of a process for receiving a request for a stored message, determining a message identifier for a message to be sent in response to the request, and removing the message from the key-value store.

FIG. 7 depicts a flow diagram 700 of a process for receiving a message request 122 (e.g., a dequeue request) for delivery of a stored message 106, determining the message ID 114 for the message 106 to be sent in response to the message request 122, and removing the message 106 from the key-value store 118 (e.g., in response to an ack request). One or more operations of the process may be performed by the messaging service module(s) 110, by other modules executing on the messaging server device(s) 108, or by modules executing on other devices.

At 702, a message request 122 (e.g., a dequeue request) may be received from a message consuming process 120 or another message consuming entity such as a computing device or a user.

At 704, the dequeue ID 124 may be accessed. As described above, the dequeue ID 124 may indicate a location in the message tracking data structure 112, the location corresponding to the message ID 114 of a message 106 stored in the key-value store 118. At 706, based on the dequeue ID 124, a message ID 114 may be determined corresponding to a deliverable message 106. In some implementations, the dequeue ID 124 is the message ID 114 for the next deliverable message 106. At 708, the determined message ID 114 may be employed as a key to retrieve the message 106 from the key-value store 118. At 710, the retrieved message 106 may be sent to the message consuming entity that sent the message request 122. At 712, the dequeue ID 124 may be advanced to indicate a message ID 114 for a next message 106 that may be vended in response to a dequeue request. The delivered message 106 may remain stored in the key-value store 118 and available for delivery to one or more other message consuming entities that send dequeue requests. In some implementations, the two data structures maintained by the message redelivery module 218 may also be modified, to adjust the potential redelivery timing of the message 106 in response to future dequeue requests as described above.

At 714, a request may be received to remove the message 106 from the queue and from the key-value store 118. As described above, the request may be an ack request that specifies the message ID 114 for the message 106 to be deleted. At 716, the message ID 114 may be employed as a key to remove the message 106 from the key-value store 118.

In some implementations, when a message 106 is removed from the key-value store 118 in response to an ack request, the message ID 114 may be marked as deleted in hash set, hash table, or other data structure storing the message IDs 114 corresponding to a particular block of the message tracking data structure 112. When the hash set for a block indicates that all of the message IDs 114 tracked in a block correspond to deleted messages 106, the block may then be de-allocated from memory and removed from the message tracking data structure 112. In cases where the blocks are stored in block files in the key-value store 118, the block file may also be deleted from the key-value store 118.

Figure 8:
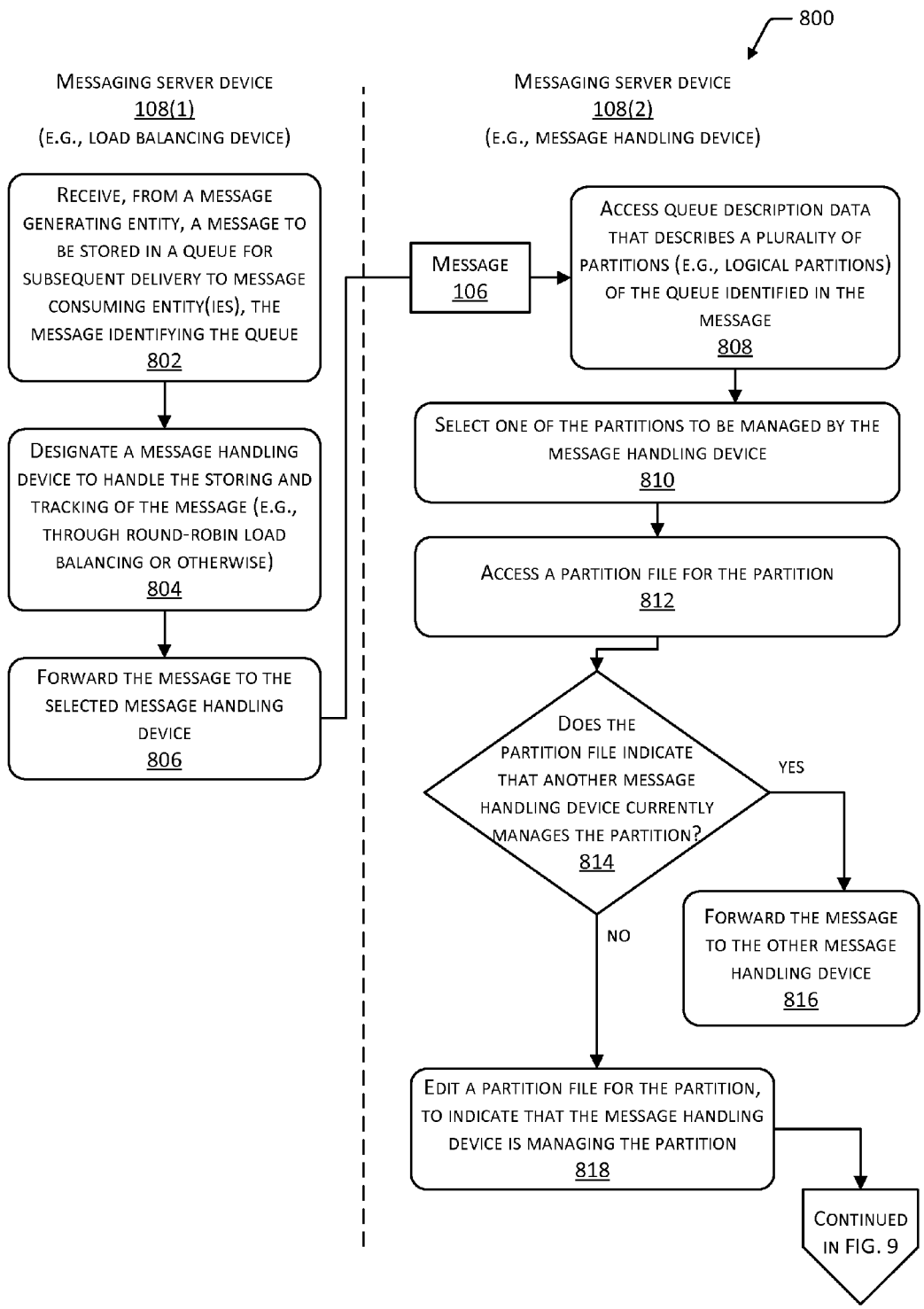
FIG. 8 depicts a flow diagram of a process for receiving a message associated with a queue, and determining a logical partition of the queue for storing the message.

FIG. 8 depicts a flow diagram 800 of a process for receiving a message 106 associated with a queue (e.g., in an enqueue request), and determining a logical partition of the queue for storing the message 106. One or more operations of the process may be performed by the messaging service module(s) 110, by the load balancing module 204, by the partition router module 206, by the partition manager module 212, by other modules executing on the messaging server device(s) 108, or by modules executing on other devices.

At 802, a message 106 may be received at the messaging server device 108(1) (e.g., the load balancing device). As described above, the message 106 may be received in an enqueue request from a message generating entity, to be stored in a queue for subsequent delivery to one or more message consuming entities. In some cases, the message 106 may include the queue ID 202 identifying the queue for storing the message 106.

At 804, the load balancing device may select a messaging server device 108(2) (e.g., a message handling device) to handle the storing, tracking, and vending of the message 106. As described above, the message handling device may be selected randomly, through a round-robin load balancing algorithm, or otherwise to distribute the message load substantially evenly among a plurality of message handling devices. At 806, the message 106 may be forwarded to the selected message handling device.

At 808, the queue description data 208 may be accessed to retrieve the queue partition data 210 describing a plurality of partitions (e.g., logical partitions) of the queue identified by the queue ID 202 included in the message 106. At 810, one of the partitions may be selected to be managed by the message handling device. At 812, the partition file 214 for the partition may be accessed.

At 814, the partition file 214 may be read to determine whether another message handling device is currently managing the partition. If not, the process may proceed to 818. If it is determined that another message handling device is currently managing the partition, e.g., based on the message handling device ID 302 in the partition file 214, the process may proceed to 816 and forward the message 106 to the other message handling device that is indicated by the partition file 214. If there is no active lock on the partition, based on the message handling device ID 302 being null, the message handling device may attempt to gain a lock on the partition and begin managing the partition.

If the process attempts to gain a lock on a partition and the partition file 214 indicates that another message handling device is currently managing the initially selected partition, the process may select another partition (e.g., a backup partition) and attempt to gain a lock on that partition. In some cases, the partition manager module 212 or another module may store data indicating the timestamp when the attempt was made to gain a lock on the initially selected partition. The process may not attempt again to gain a lock on the initially selected partition, e.g., to handle a subsequently received message 106, until a particular amount of time has elapsed, the amount of time corresponding to the duration of the time period 304 indicated in the partition file 214. As described above, the process may delay its subsequent attempt until the whole duration of the time period 304 has elapsed since the initial attempt, even if the current time appears to be in the middle of the time period 304. Delaying the entire duration of the time period 304 may prevent two different message handling devices from attempting to manage the same partition. The process may then proceed to 818.

At 818, the partition file may be edited to begin management of the partition (e.g., to obtain a lock on the partition) that is either the initially selected partition or another backup partition. Such editing may include editing the message handling device ID 302 to identify the message handling device, editing the time period 304, and editing the head pointer 310 to be an address of the head block of the message tracking data structure 112, as described above. The process may proceed as described with reference to FIG. 9.

Figure 9:
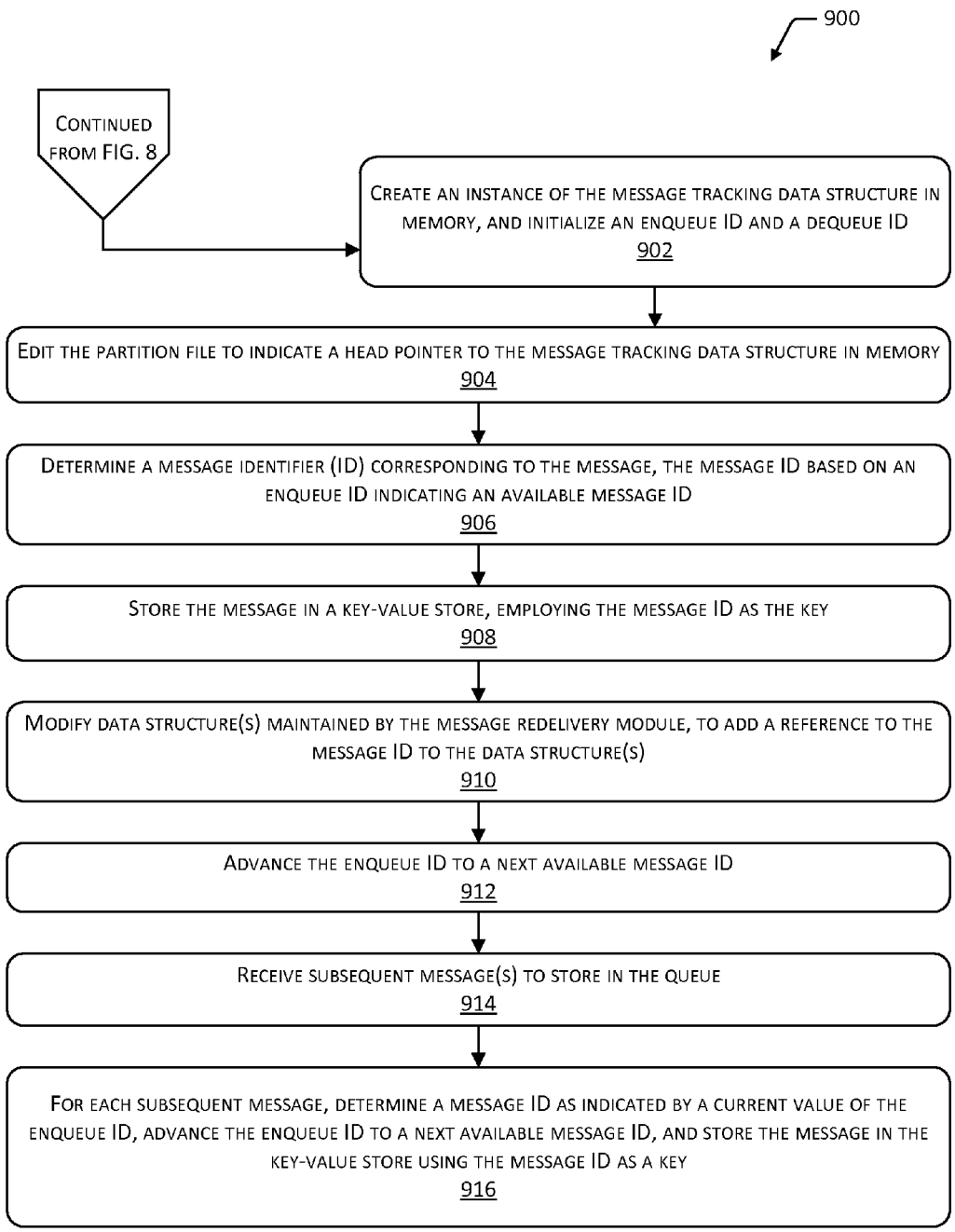
FIG. 9 depicts a flow diagram of a process for determining a message identifier for a message based on a message tracking data structure associated with the logical partition of the queue, and storing the message in a key-value store using the message identifier as a key.

FIG. 9 depicts a flow diagram 900 of a process for determining a message ID 114 for a message 106 based on the message tracking data structure 112 associated with the logical partition of the queue, and storing the message 106 in the key-value store 118 using the message ID 114 as a key. One or more operations of the process may be performed by the messaging service module(s) 110, by the partition manager module 212, by other modules executing on the messaging server device(s) 108, or by modules executing on other devices.

At 902, an instance of the message tracking data structure 112 may be created, in memory on the message handling device. The enqueue ID 116 and the dequeue ID 124 may be initialized to indicate the message IDs 114 for the next messages 106 that may be enqueued and dequeued. In some implementations, the message tracking data structure 112 may be created by allocating a first block of the message tracking data structure 112. The head pointer 310 may be set to point to the first allocated block, and the enqueue ID 116 may be initialized to indicate the first available message ID 114 in the namespace defined by the block. In some implementations, the dequeue ID 124 may not be initialized until a first dequeue request is received. At 904, the partition file 214 may be edited to set the head pointer 310 to an address of the most recently allocated block of the message tracking data structure 112 in memory, as described above. In some implementations, the head pointer 310 may be a name of the most recently created block file for the message tracking data structure 112 in the key-value store 118. In some implementations, the write operations at 904 and 818 may be included in a single write operation to update the partition file 214.

The operations at 808, 810, 812, 814, 816, 818, 902, and 904 may be performed in cases where the message handling device is not currently managing a partition when it receives the message 106. In cases where the message handling device is currently managing a partition, the process may employ that partition to handle the message 106. In such cases, the operations at 808, 810, 812, 814, 816, 818, 902, and 904 may be omitted.

At 906, the message ID 114 for the message 106 may be determined based on the next available location in the message tracking data structure 112, as described above. At 908, the message 106 may be stored in the key-value store 118 using the message ID 114 as a key. In implementations where the key-value store 118 is at least a portion of the file system of one or more messaging server devices 108, storing the message 106 may include writing the message 106 to a file in the file system, where the file has a file name that is the message ID 114.

At 910, a reference to the message 106 may be added to the two data structures maintained by the message redelivery module 218 to manage one or more potential redeliveries of the message 106. The added reference may be the message ID 114 of the message 106. At 912, the enqueue ID 116 may be advanced to indicate a next available message ID 114 for the next message 106 to be enqueued.

At 914, one or more subsequent messages 106 may be received in enqueue requests. At 916, for each subsequently received message 106, a message ID 114 may be determined and employed to store the message 106 in the key-value store 118 as described above.

Figure 10:
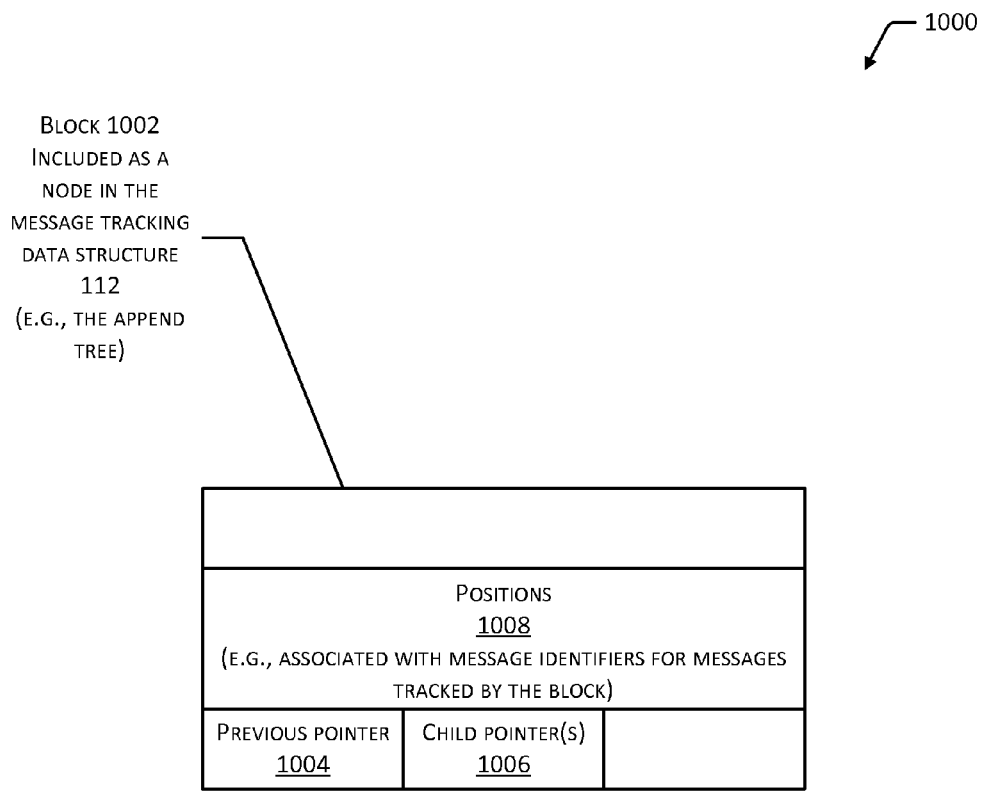
FIG. 10 depicts a schematic of an example block that may be employed in a message tracking data structure such as an append tree data structure.

FIG. 10 depicts a schematic 1000 of an example block 1002 that may be employed in the message tracking data structure 112, e.g., in implementations where the message tracking data structure 112 is an append tree data structure. As shown in FIG. 10, a block 1002 may include a previous pointer 1004 pointing to an address of a previously allocated block in the append tree data structure. The previous pointer 1004 may point to a block that is at a same hierarchical level of the append tree as the block 1002. The block 1002 may also include one or more child pointers 1006 pointing to address(es) of previously allocated block(s) that are children of the block 1002, e.g., block(s) that are at the next lower hierarchical level of the append tree. Although examples depict the message tracking data structure as an N-branch tree where N is 2 (e.g., a binary tree), such that a block 1002 may include two child pointers 1006, implementations support the use of a message tracking data structure 112 in which N is greater than 2. In implementations where the blocks 1002 may be stored in block files in a file system, the previous pointer 1004 and the child pointers 1006 of a block 1002 may be file names for other, referenced blocks 1002. In some implementations, the previous pointer 1004 and the child pointers 1006 may point to locations in memory.

The block 1002 may also include an indication of a plurality of positions 1008, each position being available to reference to a message 106. In some implementations, the positions 1008 may be indicated in the name of the block file that stores the block 1002. For example, a file name of "queue11234567890-99" may indicate that the block 1002 is to track message indexes (e.g., positions 1008) 0 through 99 for a particular partition. In such cases, the file name of the block file may be employed as a namespace for determining the message IDs 114 for messages 106, and the message IDs 114 may not be stored within the block 1002. In some implementations, the file name of the block 1002 may be a string that comprises:

a partition name, including a queue name and a partition number for the partition within the queue;

a block start address, indicating the start address of the block 1002 in memory; and a block size, indicating a size of the block 1002 and a number of messages 106 that may be tracked using the block 1002 (e.g., 0-99).

For example, a file name of "queue11234567890-99" may include a queue name of "queue", a partition name of "1", a block start address of "123456789", and a block size of "0-99". In some implementations, the block file name may also include a random number. The message ID 114 for a particular message 106 may be determined by appending a message index (e.g., one of the available message indexes 0-99) to the block file name that is the block identifier. In some implementations, the message indexes may be globally unique identifiers (GUIDs) that may be randomly or pseudo-randomly generated and stored in the block 1002, and a GUID stored at a particular position 1008 may be appended to the block file name to generate the message ID 114. The use of such GUIDs as message indexes may obfuscate the number or order of messages 106 being managed through a particular block 1002.

Alternatively, the positions 1008 may be locations in memory that are employed to store the message indexes to be included in the message IDs 114 corresponding to the messages 106. In such cases, the message indexes may be random numbers, pseudo-random numbers, or other information stored in the positions 1008. A block 1002 may indicate any number of positions 1008. For example, a block 1002 may indicate 128 positions 1008 that may be employed as message indexes in message IDs 114 for messages 106.

Figure 11:
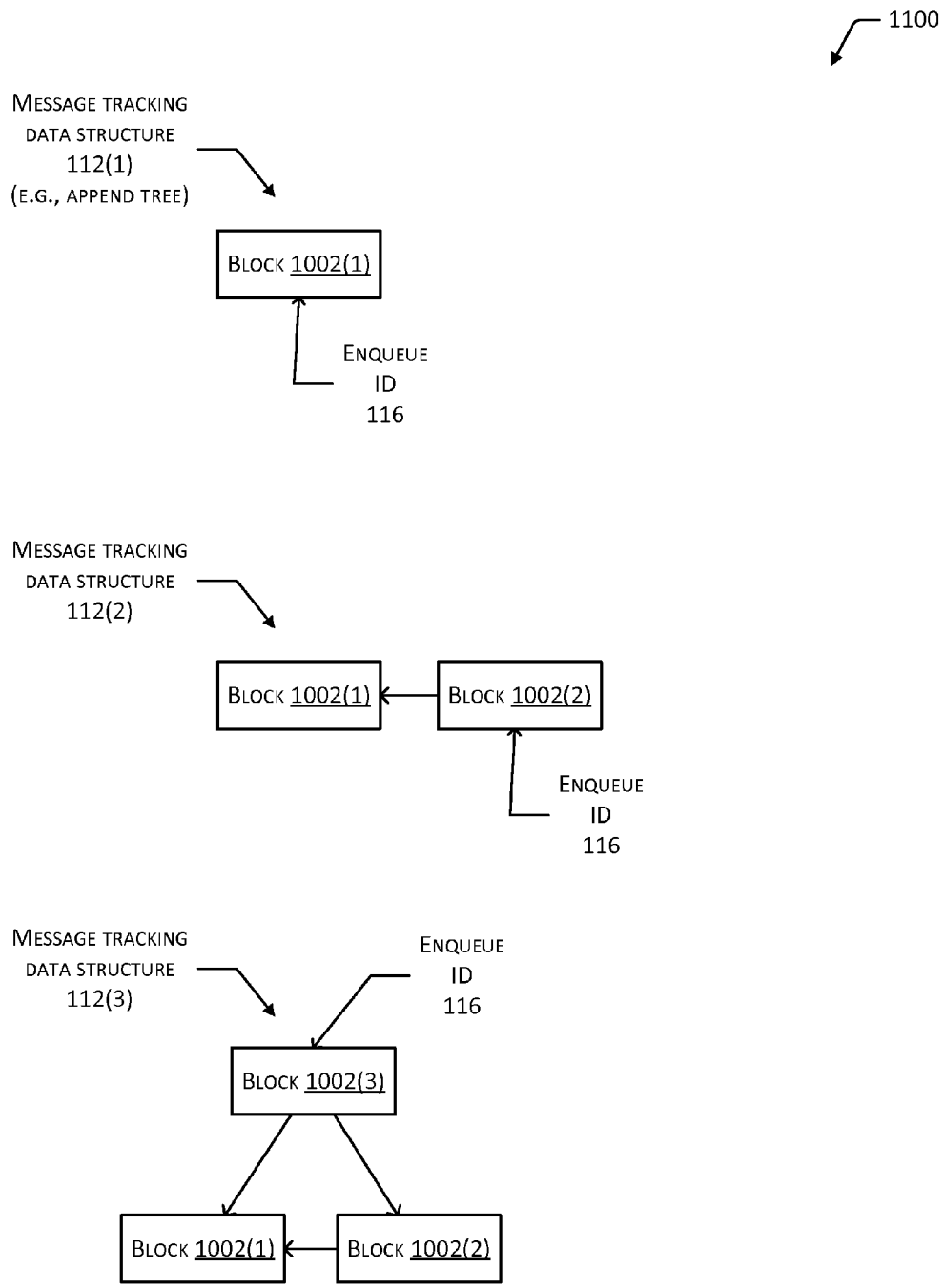
FIG. 11 depicts a schematic of first examples of a message tracking data structure such as an append tree data structure, as blocks are added to the message tracking data structure.
Figure 12:
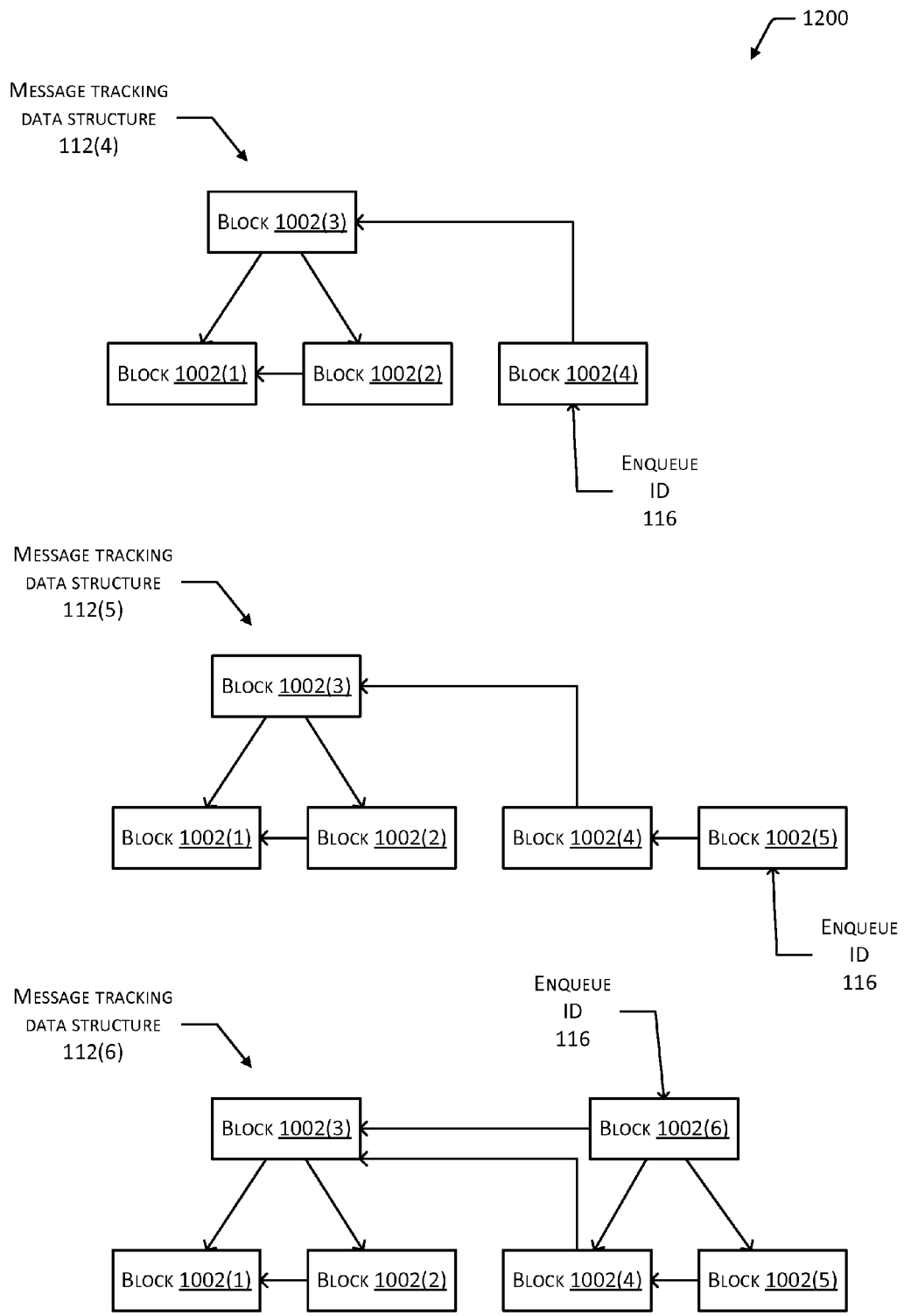
FIG. 12 depicts a schematic of second examples of a message tracking data structure such as an append tree data structure, as blocks are added to the message tracking data structure.
Figure 13:
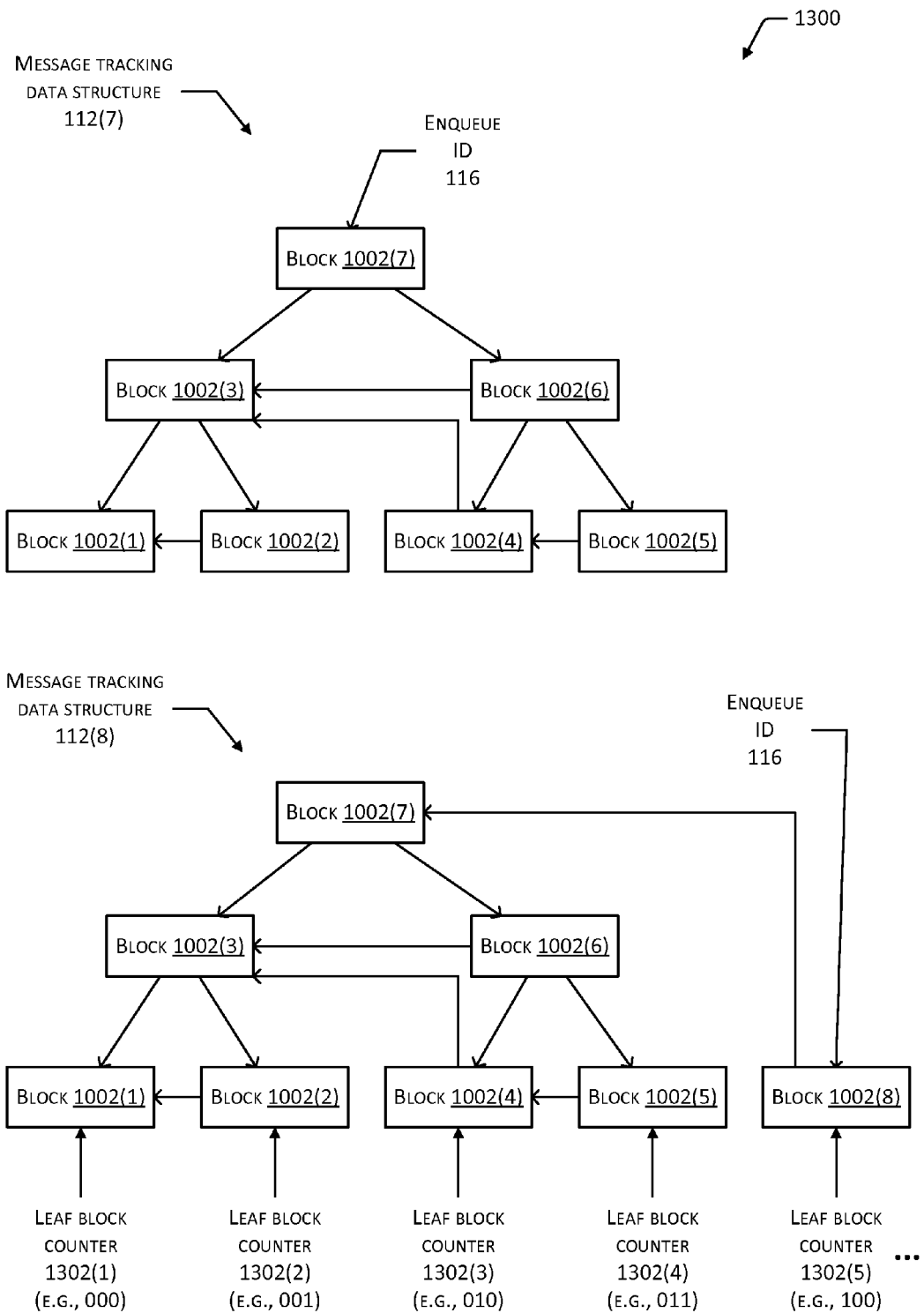
FIG. 13 depicts a schematic of third examples of a message tracking data structure such as an append tree data structure, as blocks are added to the message tracking data structure.

FIGS. 11-13 depict schematics 1100, 1200, and 1300, showing examples of the message tracking data structure 112 in various states as it is expanded to track an increasing number of messages 106. As described above, the addition and removal of blocks 1002 from the message tracking data structure 112 may be performed by the data structure manager module 216.

The message tracking data structure 112 may be a tree structure, such as an append tree data structure, that includes any number of nodes that are hierarchically arranged. In some cases, one or more pairs of the nodes may be hierarchically related as parent-to-child, such that the child pointer 1006 of a parent node points to a child node. In some cases, one or more pairs of the nodes may be related as siblings on a same hierarchical level of the message tracking data structure 112, such that the previous pointer 1004 of a node points to a sibling node. Each of the nodes in the message tracking data structure 112 may be one or more of a child node, a parent node, or a sibling node with respect to one or more other nodes. In some cases, each node of the message tracking data structure 112 may be a block 1002 as described with reference to FIG. 10.

In some cases, the append tree data structure may be immutable in that the value(s) of the data stored at a node of the append tree data structure may not be altered after the node (e.g., a block) has been instantiated and added to the append tree data structure. The immutability of the append tree data structure may provide for greater efficiency in message processing, given that implementations may not alter the data stored in the nodes of the append tree. For example, implementations may perform write operations to allocate new nodes but not to alter data stored in existing nodes. Although the data stored in each node of the append tree may not be changed (e.g., may be immutable), in some implementations nodes may be removed from the tree (e.g., pruned). For example, when the messages 106 being tracked using a particular block 1002 have all been deleted (e.g., through ack requests), the block 1002 may be de-allocated from memory and its block file deleted from the key-value store 118. Although other blocks 1002 may retain pointers pointing to the de-allocated block, those pointers may reference an empty location in memory after the block 1002 has been de-allocated. Thus, the node corresponding to the de-allocated block 1002 may be effectively removed from the append tree.

In FIG. 11, the message tracking data structure 112(1) depicts a first state in which the append tree includes one block 1002(1). The message tracking data structure 112 may be initiated by allocating a first block 1002(1) to track an initial set of messages 106 in a partition of a queue. In this first state, the enqueue ID 116 may indicate a particular message index in the first block 1002(1), indicating that the block 1002(1) has one or more positions 1008 corresponding to message IDs 114 available for tracking messages 106.

When all the positions 1008 in the block 1002(1) have been employed in message IDs 114 for enqueued messages 106, a second block 1002(2) may be allocated to provide additional positions 1008 for tracking messages 106. The message tracking data structure 112(2) depicts a second state in which the append tree includes two blocks 1002(1) and 1002(2). The previous pointer 1004 of the block 1002(2) points to the block 1002(1). On adding the new block 1002(2) to the append tree, the enqueue ID 116 may be updated to indicate a position 1008 in the block 1002(2), indicating that the block 1002(2) has position(s) 1008 available for tracking messages 106.

When the positions 1008 in the blocks 1002(1) and 1002(2) have been used, a third block 1002(3) may be allocated. As shown by the message tracking data structure 112(3), the child pointers 1006 of the block 1002(3) may point to the blocks 1002(1) and 1002(2) such that the blocks 1002(1) and 1002(2) are children of the block 1002(3). The enqueue ID 116 may be updated to indicate a position 1008 in the block 1002(3). As each block 1002 is added to the message tracking data structure 112, the pointers in the previously added blocks 1002 may not be modified. In some cases, a parent block 1002 such as the block 1002(3) may be added such that it does not currently have any child blocks, for example when the blocks 1002 that may have otherwise been related as child blocks have been de-allocated following a deletion of all the messages 106 tracked by the child blocks. In such cases, the newly added parent block 1002 may include child pointers 1006 that are null or that point to locations in memory that no longer hold the de-allocated child blocks.

With reference to FIG. 12, the message tracking data structure 112(4) depicts the append tree after a fourth block 1002(4) has been added. The fourth block 1002(4) may be added as another leaf block with leaf blocks 1002(1) and 1002(2). A leaf block may be situated at a lowest hierarchical level of the message tracking data structure 112, and may not have any child blocks. As shown in FIG. 12, the previous pointer 1004 of the fourth block 1002(4) may point to the block 1002(3). The enqueue ID 116 may be updated to indicate a position 1008 in the newly added block 1002(4). In some implementations, a newly added leaf block 1002 may be added such that its previous pointer 1004 points to the previously allocated block 1002 (e.g., the most recently allocated block 1002).

The message tracking data structure 112(5) depicts the append tree after a fifth block 1002(5) has been added. The fifth block 1002(5) may be added as another leaf block, and the previous pointer 1004 of the block 1002(5) may point to the block 1002(4). The enqueue ID 116 may be updated to indicate a position 1008 in the newly added block 1002(5).

The message tracking data structure 112(6) depicts the append tree after a sixth block 1002(6) has been added. The sixth block 1002(6) may be added at the same hierarchical level as the block 1002(3), and the child pointers 1006 of the block 1002(6) may point to the blocks 1002(4) and 1002(5) as child blocks. The previous pointer 1004 of the block 1002(6) may point to the block 1002(3). The enqueue ID 116 may be updated to indicate a position 1008 in the newly added block 1002(6).

With reference to FIG. 13, the message tracking data structure 112(7) depicts the append tree after a seventh block 1002(7) has been added. The seventh block 1002(7) may be added as a parent block relative to the blocks 1002(3) and 1002(6), and the child pointers 1006 of the block 1002(7) may point to the blocks 1002(3) and 1002(6). The enqueue ID 116 may be updated to indicate a position 1008 in the newly added block 1002(7). In some implementations, the previous pointer 1004 of a newly added parent node, such as the block 1002(7), may point to a same node as the previous pointer 1004 of the left child node of the newly added parent node. In the example of the message tracking data structure 112(7), the previous pointer 1004 of the block 1002(3) is null, so the previous pointer 1004 of the newly added block 1002(7) is also null. A null pointer may be a pointer storing null data, or a pointer that points to a location in memory that stores random data or data that is not indicative of a currently active node or block 1002.

The message tracking data structure 112(8) depicts the append tree after an eighth block 1002(8) has been added. The eighth block 1002(8) may be added as another leaf block, and the previous pointer 1004 of the block 1002(8) may point to the block 1002(7). The enqueue ID 116 may be updated to indicate a position 1008 in the newly added block 1002(8).

In some implementations, each of the blocks 1002 may be identified by a block ID. The block ID may correspond to the block file name for the block 1002. In the case of the leaf blocks, the block ID may include a leaf block counter 1302. In some implementations, the leaf block counter 1302 may be a binary number including any number of binary digits. The leaf block counter 1302 may increment with each newly added leaf block, to count 000, 001, 010, 011, 100, 101, 110, and so forth. When adding a new block 1002 to the append tree data structure, the leaf block counter(s) 1302 may be employed to determine whether the newly added block 1002 is to be a new leaf block or a new parent block. In some cases, the leaf block counter 1302 of the right-most leaf block may be examined, and the number of 1 digits may be counted (e.g., via right-shift operation(s)) from the right before a 0 digit is encountered. For example, based on the leaf block counters 1302 for the blocks 1002(1), 1002(2), 1002(4), 1002(5), and 1002(7) respectively, the count is 0, 1, 0, 2, and 0. The count indicates the number of parent blocks to be added to the append tree before the next leaf block is added. For example, the leaf block counter 1302 for the block 1002(5) exhibits a count of 2. Accordingly, after the addition of the block 1002(5) in the message tracking data structure 112(5), two additional parent blocks 1002(6) and 1002(7) are to be allocated prior to adding another leaf block 1002(8).

Table 2 includes an example of pseudo-code that may be employed to allocate a new leaf node or parent node for the append tree data structure, based on the leaf block counters 1302 as described above.

TABLE 2

```
int bits = 0;
for (int x = prev.leafId; (x & 0x1) == 0x1; x = x >> 1) bits++;
if (bits && prev.nodeId < bits) {
    next.leafId = prev.leafId;
    next.nodeId = prev.nodeId + 1;
    next.right = prev;
    next.left = prev.previous;              // = next.right.previous
    next.previous = prev.previous.previous; // = next.left.previous
} else {
    next.leafId = prev.leafId + 1;
    next.nodeId = 0;
    next.right = 0;
    next.left = 0;
    next.previous = prev;
}
```

In Table 2, the leafID corresponds to the leaf block counter 1302, and the nodeID is an ordinal identifier corresponding to the allocation order of the blocks 1002.

Figure 14:
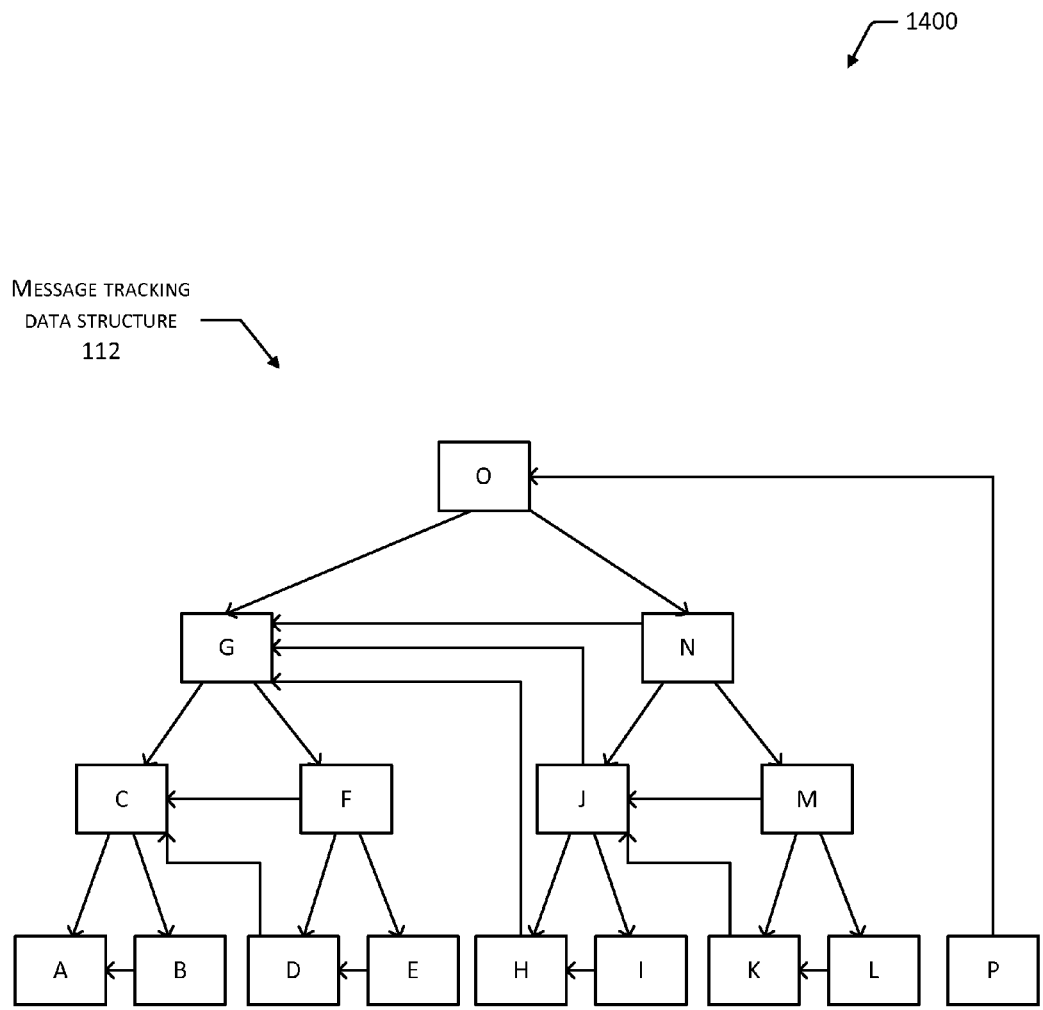
FIG. 14 depicts a schematic of an example of a message tracking data structure such as an append tree data structure.

FIG. 14 depicts a schematic 1400 of an example of the message tracking data structure 112 in a particular state. In FIG. 14, a plurality of nodes (e.g., blocks 1002) are referred to by letter designators A, B, C, D, and so forth for descriptive purposes. Table 3 below provides a description of the nodes illustrated in FIG. 14, along with a description of the pointers, leafID values, and nodeID values for each of the nodes.

TABLE 3

| Node | (p, l, r) | Node type | NodeID | LeafID |
|---|---|---|---|---|
| A | (null, null, null) | Leaf | 0000 | 0000 |
| B | (A, null, null) | Leaf | 0001 | 0001 |
| C | (null, A, B) | Parent | 0010 | |
| D | (C, null, null) | Leaf | 0011 | 0010 |
| E | (D, null, null) | Leaf | 0100 | 0011 |
| F | (C, D, E) | Parent | 0101 | |
| G | (null, C, F) | Parent | 0110 | |
| H | (G, null, null) | Leaf | 0111 | 0100 |
| I | (H, null, null) | Leaf | 1000 | 0101 |
| J | (G, H, I) | Parent | 1001 | |
| K | (J, null, null) | Leaf | 1010 | 0110 |
| L | (K, null, null) | Leaf | 1011 | 0111 |
| M | (J, K, L) | Parent | 1100 | |
| N | (G, J, M) | Parent | 1101 | |
| O | (null, G, N) | Parent | 1110 | |
| P | (O, null, null) | Leaf | 1111 | 1000 |

In Table 3, "(p, l, r)" indicates the values of the previous pointer 1004 (e.g., "p") and the left and right child pointers 1006 (e.g., "l" and "r") for each of the nodes, indicating which other node being referenced by each pointer. A null value indicates that a pointer does not reference another node.

The append tree data structure illustrated in FIGS. 11-14 exhibits a property of being substantially self-balancing as additional blocks 1002 are added and as an increasing number of messages 106 are tracked using the append tree data structure. The append tree is substantially self-balancing given the method which is employed to expand the append tree, starting with leaf nodes and expanding out (e.g., adding additional leaf nodes to the right) while expanding up to add additional parent nodes for each pair of leaf nodes. The self-balancing property of the append tree is associated with the immutability of the nodes of the append tree. For example, the immutability of the nodes may inhibit a manual re-balancing of the tree, given that the pointers included in a node (e.g., in a block 1002) may not be altered. Because the append tree is substantially self-balancing, implementations may forego additional operations to rebalance the append tree data structure.

Moreover, the append tree data structure is configured so that reaching the tail of the append tree (e.g., the oldest allocated block) from the head of the append tree (e.g., the newest allocated block) may be accomplished in a time that scales on the order of log (N), where N is the number of messages 106 tracked by the append tree data structure. In cases where the message tracking data structure 112 is a linked list, traversing the tree may be accomplished in a time that scales on the order of N. Accordingly, use of the append tree data structure as the message tracking data structure 112 may enable the oldest enqueued message 106 to be identified more efficiently by traversing back from the head of the data structure.

Figure 15:
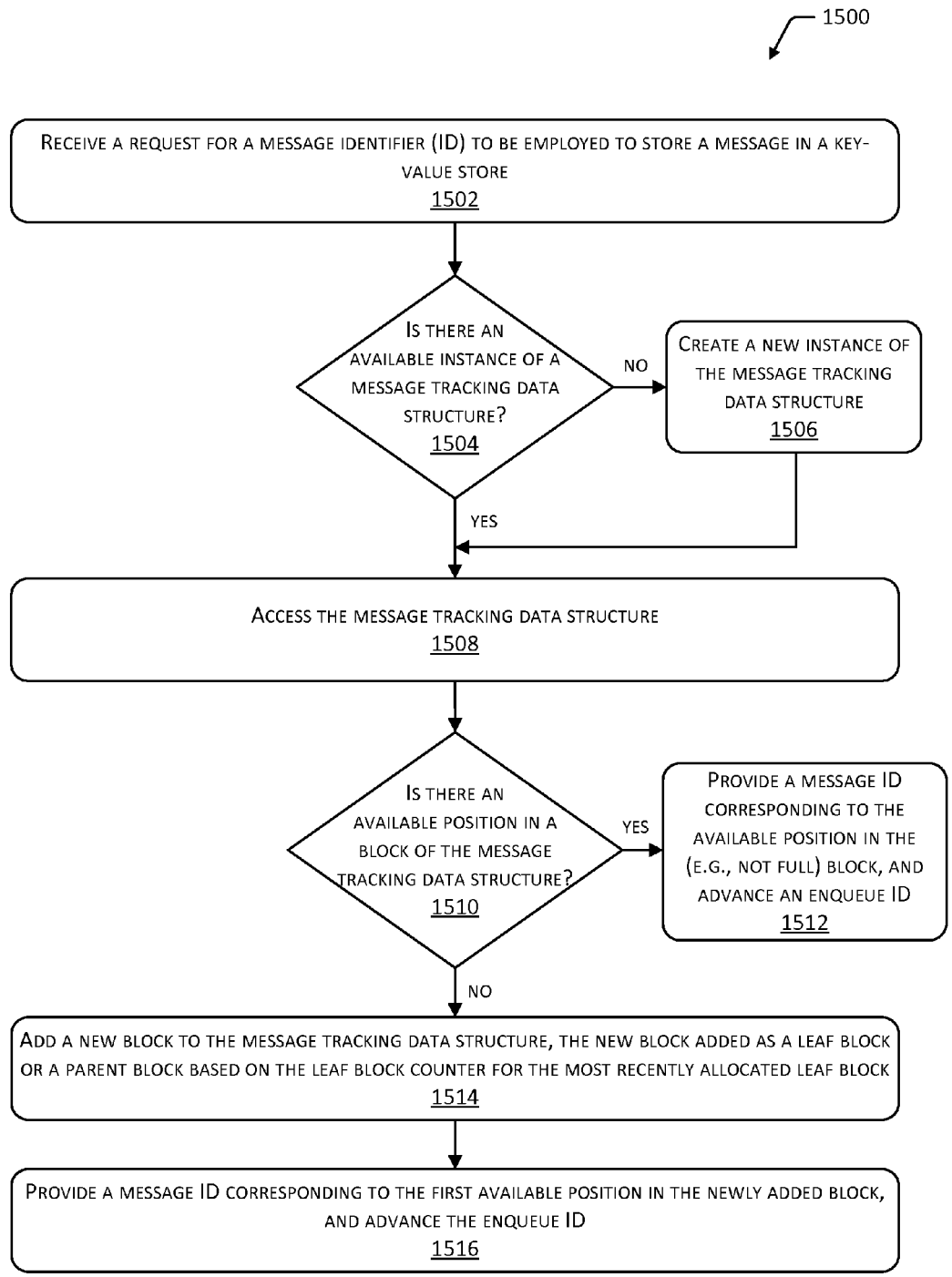
FIG. 15 depicts a flow diagram of a process for employing a message tracking data structure to determine and track message identifiers.

FIG. 15 depicts a flow diagram 1500 of a process for employing the message tracking data structure 112 to determine and track message IDs 114, or other types of identifiers. One or more operations of the process may be performed by the messaging service module(s) 110, by the partition manager module 212, by the data structure manager module 216, by other modules executing on the messaging server device(s) 108, or by modules executing on other devices.

At 1502, a request may be received for a message ID 114 to be employed to store a message 106 in the key-value store 118. As described above, the request may be received based on receiving an enqueue request indicating a message 106 to be managed within a partition of a queue.

At 1504, a determination is made whether there is an available instance of a message tracking data structure 112 that may be employed to determine a message ID 114 for the message 106. If so, the process may proceed to 1508. If not, the process may proceed to 1506 and create a new instance of the message tracking data structure 112 (e.g., in memory). The process may then proceed to 1508. At 1508, the message tracking data structure 112 may be accessed.

At 1510, a determination is made whether there is an available position 1008 in a block 1002 of the message tracking data structure 112. If so, the process may proceed to 1512, and provide the message ID 114 corresponding to the available position 1008 in the block 1002. The enqueue ID 116 may be advanced to the next available position 1008.

If it is determined at 1510 that there is not currently an available position 1008 in the message tracking data structure 112, the process may proceed to 1514. At 1514, a new block 1002 may be added to the message tracking data structure 112 as a leaf block or as a parent block. As described with reference to FIGS. 13 and 14, the determination of whether the new block 1002 is a leaf or a parent may be based on the leaf block counter 1302 for the most recently allocated (e.g., right-most) leaf block. At 1516, the message ID 114 may be provided corresponding to the first available position 1008 in the newly added block 1002. The enqueue ID 116 may be advanced to the next available position 1008.

Implementations support the use of any number of messaging server devices 108(2) (e.g., message handling devices) to handle messages 106 within any number of partitions of a message queue. In some implementations, one message handling device may be employed to manage a single partition, e.g., in cases where the queue is not divided into logical partitions. In such implementations, the partition locking described above may not be employed, given that there is one message handling device managing the single partition of the queue. In such configurations, the message tracking data structure 112 and the storage of messages 106 the key-value store 118 may still enable recovery from a failure of the message handling device. For example, if the message handling device crashes and loses state (e.g., loses in-memory data), the message handling device may recover and begin processing enqueue and dequeue requests after a load time. During the load time, the message tracking data structure 112 may be recreated in memory on the message handling device based on the copy of the message tracking data structure 112 stored (e.g., on disk) on the messaging server device(s) 108 (3). Enqueues may begin after a first block 1002 of the message tracking data structure 112 is written to memory. Dequeues may begin after the loading of the oldest messages 106, which may be determined after a traversal of the message tracking data structure 112. As described above, the traversal may be completed in a time that is proportional to log(N), where N is the number of messages 106 currently being tracked using the message tracking data structure 112. After loading the oldest block 1002, a number of read operations corresponding to the block size may be performed to scan for the oldest message 106 that is currently being tracked and stored in the key-value store 118.

In some implementations, multiple message tracking devices may be employed to manage a single partition of a queue. In such implementations, the partition locking may be employed given that the partition locking substantially reduces the chance of multiple message handling devices processing the same partition simultaneously, which may result in message loss or other incorrect behavior. A queue may be more available in this configuration because a failure of a single message handling device may lead to a short period of outage (e.g., based on the time period 304 of the lock) before another message handling device takes over message processing. Accordingly, this configuration may enable failover in the system. Such implementations may not include a separate discovery mechanism for new message handling devices, and may not include manual setup of new message handling devices, given that newly added message handling devices may begin attempting to take partition locks as the devices are brought online. Once a lock is taken by a newly added message handling device, the device's routing information may be added to the partition file 214 enabling other message handling devices to forward messages 106 to the new message handling device. Accordingly, implementations enable the number of message handling devices to be increased by bringing the devices online and routing queue traffic to them.

In some implementations, a single message handling device may be employed to manage multiple partitions of a queue. With multiple partitions, the throughput capability for message handling may be increased. In some cases where a single partition is employed, throughput may be constrained by serial I/O to access single file objects in the key-value store 118. In the single-partition configuration where the blocks and partition files are written in succession, the performance gains achieved through the use of one block for multiple messages may eventually reach a performance bottleneck. Using multiple, independently managed partitions may allow for independent I/O operations and may improve performance. Because the keys (e.g., the message IDs 114) are independent of one another in the message tracking data structure 112, the messages 106, and the multiple queues, the message storage load may be distributed substantially evenly across the distributed key-value store 118. Accordingly, implementations may provide performance gains compared to other techniques for implementing message queues on single hosts using local data stores, given that such techniques may experience performance bottlenecks as they concentrate messages onto a small number of hosts and saturate I/O.

In some implementations, multiple message handling devices may be employed to handle messages within multiple partitions of one or more queues. In this configuration, performance may be optimized by spreading I/O across computing devices and across files, with respect to the messaging server devices 108(2) (e.g., the message handling devices) as well as the messaging server devices 108(3) that provide the distributed key-value store 118. Any number of partitions and message handling devices may be added to the system to enable any throughput level of throughput for handling messages for one or more queues. Adding additional message handling devices may be accomplished through the partition locking as described above. Moreover, as described above the message handling devices may forego a coordinated time source to synchronize their clocks, because the locking is based on the independent clocks of the message handling devices not exceeding a maximum skew within a lock period (e.g. the time period 304). Automatic failover for each partition is provided by the partition locking as described above. Moreover, implementations may also enable arbitrarily high availability for enqueue operations given that any particular enqueue request may be sent to any number of message handling devices handling different partitions until an enqueue succeeds.

The implementations described herein may employ a key-value store 118 (e.g., a distributed key-value store 118) supporting conditional put and conditional get operations. In some implementations, a file system may be employed as the key-value store 118. The use of a file system as the key-value store 118 may enable rapid setup and operation of the messaging service on a wide range of supporting platforms. Although the above examples describe employing the append tree data structure to determine message IDs 114 for tracking messages 106 stored in the key-value store 118, implementations also support the use of the append tree data structure in other scenarios, contexts, and environments. The append tree data structure may be employed to store any type and any amount of data.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A system, comprising:
at least one computing device configured to implement one or more services, wherein the one or more services are configured to:
  access a data structure comprising a plurality of nodes that are hierarchically related, the data structure being an append tree data structure that includes:
    a plurality of leaf nodes at a first hierarchical level of the data structure, the plurality of leaf nodes being unrelated as a parent of other nodes; and
    one or more parent nodes at one or more second hierarchical levels of the data structure, at least one of the one or more parent nodes being related as a parent of at least two of the plurality of leaf nodes;
  examine a binary counter incremented for each leaf node added to the plurality of leaf nodes of the data structure, the binary counter indicating a value associated with an order in which the plurality of leaf nodes were added to the data structure; and
  determine a value of a binary count of 1-valued bits in a portion of the binary counter inclusively ranging from a least significant bit of the binary counter to a least significant 0-valued bit of the binary counter, the value of the binary count indicating a number of additional parent nodes to be added to the data structure prior to adding an additional leaf node to the data structure.

2. The system of claim 1, wherein the one or more services are further configured to:
receive data to be stored in the data structure;
based on a determination that the plurality of nodes included in the data structure are storing other data, add at least one additional node to the data structure; and
determine whether the at least one additional node is added as an additional parent node or an additional leaf node, based at least partly on the value of the binary count.

3. The system of claim 2, wherein:
the value of the binary count is at least two, indicating that at least two additional parent nodes are to be added to the data structure prior to adding an additional leaf node; and
adding the at least one additional node includes adding one of the at least two additional parent nodes as a parent of another of the at least two additional parent nodes.

4. The system of claim 2, wherein:
the value of the binary count is one, indicating that an additional parent node is to be added to the data structure prior to adding an additional leaf node; and
adding the at least one additional node includes adding the additional parent node as a parent of two of the plurality of leaf nodes.

5. The system of claim 2, wherein:
the value of the binary count is zero, indicating that no additional parent nodes are to be added to the data structure prior to adding an additional leaf node; and
adding the at least one additional node includes adding the additional leaf node at the first hierarchical level of the data structure, the additional leaf node being related as a child of at least one of the one or more parent nodes.

6. A computer-implemented method, comprising:
accessing a data structure comprising a plurality of nodes that are hierarchically related, the data structure including:
  a plurality of leaf nodes at a first hierarchical level of the data structure, the plurality of leaf nodes being unrelated as a parent of other nodes; and
  one or more parent nodes at one or more second hierarchical levels of the data structure, at least one of the one or more parent nodes being related as a parent of at least two of the plurality of leaf nodes;
examining a binary counter incremented for each leaf node added to the plurality of leaf nodes of the data structure, the binary counter indicating a value associated with an order in which the plurality of leaf nodes were added to the data structure; and
based at least partly on the binary counter, determining the value of a binary count of the binary counter indicating a number of additional parent nodes to be added to the data structure prior to adding an additional leaf node to the data structure.

7. The method of claim 6, wherein:
the determining of the number of additional parent nodes to be added to the data structure prior to adding the additional leaf node to the data structure further comprises:
  determining the value of the binary count of 1-valued bits in a portion of the binary counter inclusively ranging from a least significant bit of the binary counter to a least significant 0-valued bit of the binary counter, the value of the binary count indicating the number of additional parent nodes to be added to the data structure prior to adding the additional leaf node to the data structure.

8. The method of claim 6, wherein the data structure is an append tree data structure in which a node of the plurality of nodes includes a block in memory, the block including a plurality of positions for storing data.

9. The method of claim 6, wherein the data structure is substantially self-balancing as additional nodes are added to the data structure.

10. The method of claim 6, further comprising:
receiving data to be stored in the data structure;
based on a determination that the plurality of nodes included in the data structure are storing other data, adding at least one additional node to the data structure; and
determining whether the at least one additional node is added as an additional parent node or an additional leaf node, based at least partly on the value of the binary count of the binary counter.

11. The method of claim 10, wherein:
the value of the binary count of the binary counter indicates that at least two additional parent nodes are to be added to the data structure prior to adding an additional leaf node; and
adding the at least one additional node includes adding one of the at least two additional parent nodes as a parent of another of the at least two additional parent nodes.

12. The method of claim 10, wherein:
the value of the binary count of the binary counter indicates that an additional parent node is to be added to the data structure prior to adding an additional leaf node; and
adding the at least one additional node includes adding the additional parent node as a parent of two of the plurality of leaf nodes.

13. The method of claim 10, wherein:
the value of the binary count of the binary counter indicates that no additional parent nodes are to be added to the data structure prior to adding an additional leaf node; and
adding the at least one additional node includes adding the additional leaf node at the first hierarchical level of the data structure, the additional leaf node being related as a child of at least one of the one or more parent nodes.

14. One or more computer-readable media storing instructions which, when executed by at least one processor, instruct the at least one processor to perform actions comprising:
initiate a binary counter;
initializing an append tree data structure by determining a first node of the append tree data structure, the first node including a first previous pointer and two or more first child pointers, the first previous pointer and the two or more first child pointers not referencing other nodes;
increment the binary counter for each leaf node added to the data structure, each leaf node having child pointers not referencing other nodes;
based on a value of the binary counter, adding a second node to the append tree data structure, the second node including a second previous pointer that references the first node, the second node including two or more second child pointers not referencing other nodes; and
based on the value of the binary counter, adding a third node to the append tree data structure, the third node including a third previous pointer that does not reference another node, the third node including two or more third child pointers that reference the first node and the second node.

15. The one or more computer-readable media of claim 14, the actions further comprising:
based on the value of the binary counter, adding a fourth node to the append tree data structure, the fourth node including a fourth previous pointer that references the third node, the fourth node including two or more fourth child pointers not referencing other nodes.

16. The one or more computer-readable media of claim 15, the actions further comprising:
based on the value of the binary counter, adding a fifth node to the append tree data structure, the fifth node including a fifth previous pointer that references the fourth node, the fifth node including two or more fifth child pointers not referencing other nodes.

17. The one or more computer-readable media of claim 16, the actions further comprising:
based on the value of the binary counter, adding a sixth node to the append tree data structure, the sixth node including a sixth previous pointer that references the third node, the sixth node including two or more sixth child pointers that reference the fourth node and the fifth node.

18. The one or more computer-readable media of claim 17, the actions further comprising:
based on the value of the binary counter, adding a seventh node to the append tree data structure, the seventh node including a seventh previous pointer that does not reference another node, the seventh node including two or more seventh child pointers that reference the third node and the sixth node.

19. The one or more computer-readable media of claim 18, the actions further comprising:
based on the value of the binary counter, adding an eighth node to the append tree data structure, the eighth node including an eighth previous pointer that references the seventh node, the eighth node including two or more eighth child pointers not referencing other nodes.

20. The one or more computer-readable media of claim 14, wherein:
the append tree data structure is substantially self-balancing as the append tree data structure is expanded to include additional nodes based on the value of the binary counter; and
the append tree data structure is substantially immutable such that data included in a node of the append tree data structure is not altered after the node is added to the append tree data structure.

* * * * *